US012215756B2

(12) United States Patent
Mollick

(10) Patent No.: US 12,215,756 B2
(45) Date of Patent: Feb. 4, 2025

(54) RATCHET LOAD BINDER WITH TENSION MONITOR SYSTEM

(71) Applicant: Peter Joseph Mollick, Phoenix, AZ (US)

(72) Inventor: Peter Joseph Mollick, Phoenix, AZ (US)

( * ) Notice: Subject to any disclaimer, the term of this patent is extended or adjusted under 35 U.S.C. 154(b) by 380 days.

(21) Appl. No.: 17/890,216

(22) Filed: Aug. 17, 2022

(65) Prior Publication Data

US 2022/0389988 A1     Dec. 8, 2022

Related U.S. Application Data

(63) Continuation-in-part of application No. 17/083,811, filed on Oct. 29, 2020, now Pat. No. 11,440,458.

(51) Int. Cl.
*F16G 11/12*         (2006.01)
*F16G 3/00*          (2006.01)
(Continued)

(52) U.S. Cl.
CPC .............. *F16G 11/12* (2013.01); *F16G 3/006* (2013.01); *F16H 25/20* (2013.01); *F16H 31/005* (2013.01)

(58) Field of Classification Search
CPC ........ B60P 7/083; B60P 7/0838; F16G 11/12; F16G 3/006; F16G 15/00; F16H 31/005;
(Continued)

(56) References Cited

U.S. PATENT DOCUMENTS 6,945,516 B1    9/2005 Scott
7,055,804 B2 *  6/2006 Scott ................... B60P 7/083
                                                  254/237

(Continued)

*Primary Examiner* — Jason W San
*Assistant Examiner* — Louis A Mercado

(57) ABSTRACT

A hand operated tool for binding a load. The tool including a hollow tube with interior left hand and right hand threads at opposing ends. Opposing rods with exterior threads on one end and a releasable connection device on the other end that is screwed into each end of the tube. A gear rigidly mounted and encircling the tube allowing a pivotly attached ratcheting U-pawl to engage the gear teeth, the U-pawl attached to and carried by a handle assembly mounted on each side of the gear, the handle protruding perpendicular from the tube. The handle turning the tube in a first rotational direction drawing the rods closer together tightening the bind, the handle turning the tube in a second rotational direction moving the rods farther apart loosening the bind, the rods remaining stationary in rotation during rotation of the tube. A blocking device may be installed to prevent the U-pawl from pivoting into a position to turn the tube in the second rotational direction, that would loosen the bind on the load, the blocking device allowing normal ratcheting and turning of the tube in the first rotational direction tightening the bind on the load. A recessed-pawl partially pivoting independently of the U-pawl and engaging with the gear to prevent the tube from turning in the second-rotational-direction that would loosen the bind on the load when the U-pawl is in a neutral position whereby the U-pawl is not engaged with the gear. In addition, a tension-detecting-device suitable to detect or measure the tension on the ratchet load binder rods and also monitor and communicate the tension to the operator is also provided.

35 Claims, 14 Drawing Sheets

(51) Int. Cl.
*F16H 25/20* (2006.01)
*F16H 31/00* (2006.01)

(58) Field of Classification Search
CPC ... F16H 2025/2059; F16H 25/00; F16H 25/20
See application file for complete search history.

(56) References Cited

U.S. PATENT DOCUMENTS

| | | | | |
|---|---|---|---|---|
| 7,451,962 | B1* | 11/2008 | Kennedy | F16G 11/12 |
| | | | | 254/233 |
| 8,152,139 | B2* | 4/2012 | Wang | B60P 7/083 |
| | | | | 254/218 |
| 8,166,831 | B2* | 5/2012 | Ruan | B60P 7/083 |
| | | | | 73/862.42 |
| 8,851,255 | B2* | 10/2014 | Mitchell | F16G 11/12 |
| | | | | 254/235 |
| 9,103,405 | B2* | 8/2015 | Smetz | F16B 39/12 |
| 9,453,557 | B2 | 9/2016 | Chou | |
| 9,561,838 | B1* | 2/2017 | Byers | F16G 11/12 |
| 10,752,156 | B2* | 8/2020 | Ruan | B60P 7/083 |
| 11,371,582 | B2* | 6/2022 | Martens | B60P 7/083 |
| 2014/0326935 | A1* | 11/2014 | Chao | B60P 7/083 |
| | | | | 254/235 |

* cited by examiner

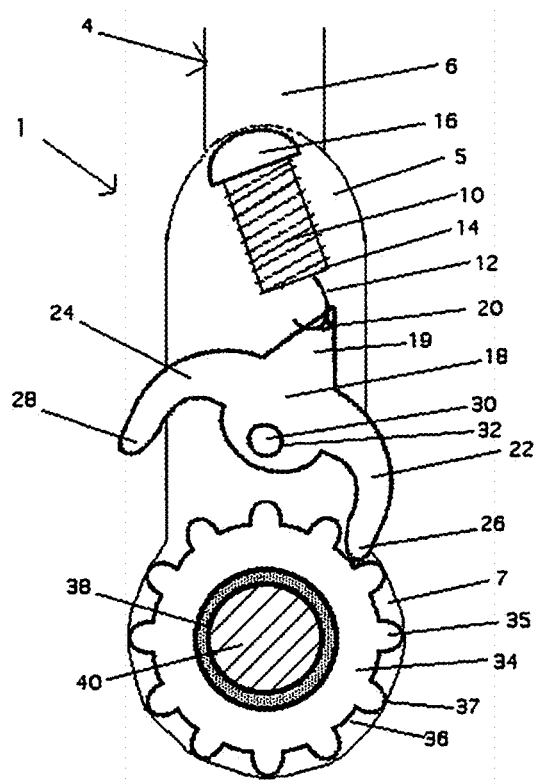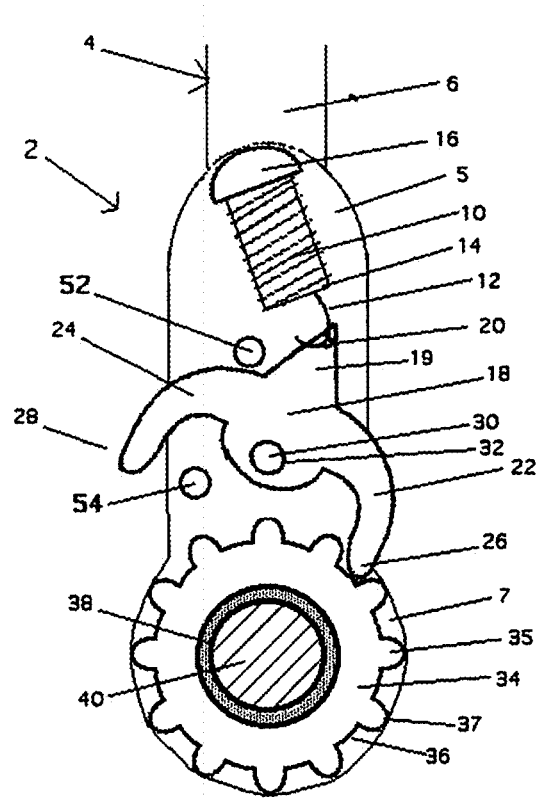
FIG. 3
Prior art
FIG. 4
Amended

RATCHET LOAD BINDER WITH TENSION MONITOR SYSTEM

CROSS-REFERENCE TO RELATED APPLICATIONS

This application is a Continuation-In-Part of U.S. patent application Ser. No. 17/083,811 titled "Ratchet load binder with taper deterrent features" filed Oct. 29, 2020, now U.S. Pat. No. 11,440,458, issued Sep. 13, 2020, the contents of which are incorporated herein by reference in their entirety.

BACKGROUND OF THE INVENTION

1. Field of the Invention

The invention relates to a mechanical device used to bind and secure a load usually for transportation on a truck deck or a trailer deck, particularly cargo such as equipment or merchandise that would normally shift during transport when not secured in place, the mechanical device being a ratchet load binder used individually, in multiples or in conjunction with chains or straps.

2. Description of Related Art

Ratchet load binders are used for securing a load or loads normally carried by a truck or truck and trailer combination for transportation of the load. Ratchet load binders serve the purpose of binding the load in place during transportation or for the general securing of the load. The load can be material such as construction materials, or in many cases the load is machinery and equipment. Load securing chains are generally used in place of load securing straps when the weight of the load is great or especially used when a high weighted load has the ability to roll, such as an agricultural tractor. Chains generally have a higher weight supporting capacity than straps. In some situations, the load may be directly connected to the ratchet load binder with hooks or other means mounted to the load and also mounted to the truck deck eliminating the need for straps or chains. Usually, at least two and many times more than two ratchet load binders and chains are used to secure a single load. When using a ratchet load binder with attached hooks for attaching to a chain link, only one end of the chain requires a hook, the hook on the chain binder will attach to the chain, negating the need for a second hook on the chain.

Although there are a few different ways to secure a load with a ratchet load binder and chains, a common method is attaching the ratchet load binder to separate chains at each end of the ratchet load binder, then securing one of the chains to the truck deck and the other chain to the load or over the load and to the opposing side of the truck deck. In the alternative, one chain can be attached to the ratchet load binder and then attach the other side of the ratchet load binder directly to a truck deck eyelet, then securing the chain to the load or over the load and attaching to the opposing side of the truck deck at another eyelet. This two above stated chain securing methods prevents any part of the chain from being positioned along side of the chain binder, allowing a full rotational motion of the ratchet chain binder handle operation with no interference from the chain blocking the rotation of the handle. Chain load securing methods that align the chain along side of the chain binder can be difficult to use in some instances and tend to limit the rotational operation of the ratchet load binder handle that can be further complicated when additional obstructions are in the way such as the truck deck or a trailer fender well. Another method of binding a load on a truck deck is to attach the ratchet load binder directly to the truck deck on one end of the binder and the other end of the binder directly to the load with an eyelet attachment on the load, this method also normally allows a full rotational motion of the ratchet chain binder handle operation with no interference.

A conventional ratchet load binder in the marketplace today including this disclosed invention primarily comprises an elongated tube having opposing open ends and internal threads, two rods, a handle with a gear and a ratcheting U-shaped pawl mounted in the handle. The U-shaped pawl herein referred to as a U-pawl. The tube has interior threads starting at each end with each end threading in opposite directions, a first end having right-hand internal threads and a tube second end 40 having left-hand internal threads. A gear with exterior teeth is rigidly attached around the tube and causes the tube to rotate with the gear. The two rods have exterior threads starting on one end and proceeding along the rod, the rod threads matching the tube threads. A releasable means for connection such as a hook is usually loosely and flexibly attached to the other end of the rod for attaching to a chain, eyelet or strap. The handle has two sides that wrap around the tube and is rotatably independent from the gear and tube, the ratcheting U-pawl when attached to the handle and pivotally secured next to the gear provides a first-driving-position of the tube, a second-driving-position of the tube and a neutral-position located between the two driving positions, therefore, able to drive the rotation of the gear and the tube in a first-rotational-direction or a second-rotational-direction, depending on the chosen position of the U-pawl. A spring holds the U-pawl in its selected position, the spring providing a sizable amount of pressure towards the U-pawl. The first-rotation-direction draws the rods closer together, therefore tightening the chain on the load and the second rotational direction causing the rods to move farther apart, therefore loosening the chain on the load. After loosely installing the ratchet load binder and the accompanied chains on or around a load to be secured, the binder U-pawl is set to the first-driving-position to tighten the chain for transportation of the load. After the load is ready for removal from the truck or trailer, the binder U-pawl is set to the second-driving-position to loosen and remove the chains and the binder from the load.

One longstanding problem with ratchet load binders has been the inability to easily prevent theft or tampering of the load binder, the chain, or the load, as it is very easy for a person to move the U-pawl into the second-driving-position to loosen the binder and chain to either vandalize the secured load or steal the binder, the chain or the load. There is only a limited amount of theft protection that can be added to ratchet load binders and the chains or straps that are normally securing a load, as it is easy enough to use a battery powered grinder or a large bolt cutter tool to sever the chain or strap from the load to steal the load, the binder or the chain. The object to securing a load binder from theft or tampering is to make it as difficult as possible to loosen the load binder tension on the load without using additional tools.

There have been attempts and patents granted to help deter theft or tampering of ratchet load binders with limited success. One such previously disclosed theft deterrent locking device on a load binder is disclosed in U.S. Pat. No. 9,453,557. This patent describes a locking method and two holes to insert a lock shackle into. The method of locking the chain binder in this patent is locking the gear to the handle forcing the gear and the tube to rotate with the handle preventing a back and forth action of the handle compared to the tube, preventing a loosening or tightening of the bind on the load when there is an obstruction that would obstruct a full rotation of the handle and the tube. If there is no obstruction obstructing the full rotation of the handle and the tube, the binder handle can easily be turned in either direction, loosening or tightening the bind on the load, therefore, defeating the purpose of the locking method of the binder. Another previously disclosed theft deterrent locking device is disclosed in U.S. Pat. No. 6,945,516. This patent describes a locking method and two holes in the handle wherein a lock inserted in the two holes of the handle locks the U-pawl into the engaged position with the gear wherein the U-pawl is engaged with the gear teeth without any leeway for the U-pawl to be removed from the engagement of the gear teeth, therefore resulting in the same scenario as U.S. Pat. No. 9,453,557 preventing a back and forth action of the handle compared to the tube, preventing a loosening or tightening of the bind on the load when there is an obstruction that would obstruct a full rotation of the handle and the tube. If there is no obstruction obstructing the full rotation of the handle and the tube, the binder handle can easily be turned in either direction, loosening or tightening the bind on the load, therefore, defeating the purpose of the locking method of the binder.

The above two mentioned patented theft deterrent locking devices are limited in deterring the theft of the ratchet load binders, chains or the load, as they have limitations in their practical use. The most obvious limitation in their practical use is the locking of the gear and the tube rotation to the handle rotation, as both of the above cited patents use this method. This allows the ratchet load binder to be tightened or loosened if there is unobstructed rotational motion of the handle, the unobstructed rotational motion of the handle is exacerbated with the folding handle feature in both of the above cited patents as the folding handle will be able to possibly bypass an obstruction that would normally obstruct a non-folding handle. In the instance of the handle in the folded down position, there still may be enough leverage to loosen the ratchet chain binder, therefore loosening the chains securing the load. It is noted that U.S. Pat. No. 6,945,516 recommends using excess chain to attach to the binder locking device to prevent useable rotational motion of the binder handle when the locking device is in place, but in many instances when securing a load on a truck or trailer, there may not be excess chain or even any chain available in certain load binding applications where no chain is used. For the above reasons, the two U.S. Pat. Nos. 9,453,557 and 6,945,516 are limited in practical use for theft and tamper deterrent in many load-binding applications. Another drawback of the above two US patents is the inability to tighten the bind on the load when the gear or the pawl locking device is in place. In the instance there are obstructions to the full rotations of the ratchet load binder handles, to tighten or check the bind on the load being transported, the locking device needs to be removed to provide back and forth movement of the handle and the pawl to ratchet turn the binder tube in order to draw the bind on the load tighter. The removing and then reinstalling of the locking devices can be a time consuming duty that may discourage the truck operator from checking or tightening the bind on the load.

Many ratcheting load binders in the marketplace today including the presently disclosed invention comprise multiple positions of the U-pawl for engagement or non-engagement of the U-pawl teeth with the gear teeth, the U-pawl having a first tooth and a second tooth, the prior art U-pawl positions described below:

i. a first-driving-position wherein the U-pawl first tooth is engaged with the gear teeth to turn the tube in the first-rotational-direction, tightening the bind on the load, the U-pawl being securely held in position;

i. a second-driving-position wherein the U-pawl second tooth is engaged with the gear teeth to turn the tube in the second-rotational-direction, loosening the bind on the load, the U-pawl being securely held in position;

i. a middle-neutral-position wherein the U-pawl is pivotly centered between the first-driving-position and the second-driving-position, and the gear is uninhibited by the U-pawl, the U-pawl may or may not be securely held in position;

Although with the above stated elements of the device being present, and while ratchet load binders are very effective in securing a load on a truck deck or flat bed trailer deck, the load being transported can shift in ways unnoticed by a driver of the transportation vehicle hauling the load. In an example of a stacked or boxed load on a flat bed deck, the load can shift positions while traveling on a rough roadway allowing the chains securing the load to loosen the bind on the load. In another example if the load being hauled is a vehicle such as an agricultural tractor, if an air inflated tire of the load loses air pressure and deflates, the load will shift in a downward position loosening the chains securing the load. Either one of these instances may cause the load to shift or loosen enough for the load to be separated from the truck or trailer and fall from the truck or trailer.

BRIEF SUMMARY OF THE INVENTION

The disclosed invention provides a detection, measuring, monitoring and alert system for tension that is applied to a ratchet load binder and device such as a chain for securing a load on a truck deck or flat bed trailer deck. Sufficient tension is crucial to keeping a load secured on a truck or trailer deck during transport especially if the load is a load that may shift or be altered during the transportation of the load, such as in the case of a vehicle with air inflated tires that are supporting the load. A tire that has deflated during the transportation of the load will shift the load in a downward direction, therefore possibly loosening the load binding chains. The disclosed detection, measuring, monitoring and alert system for tension that is applied to a ratchet load binder may be used on a standard ratchet load binder, a ratchet load binder with tamper deterrence features, or a lever style load binder. The disclosed invention adds a practical functional degree of theft and tamper deterrence to the chain binder, chain, and the load that is being bound and secured. The disclosed invention is an improvement over previously cited patent theft and tamper deterrent locking devices on ratcheting load binders. The disclosed invention adds a means to insert a blocking device in the ratchet load binder handle assembly that allows the inserted blocking device to block and prevent the ratchet load binder U-pawl from moving into the second-driving-position that would turn the tube in the second-rotational-direction loosening the bind on the load, while still allowing the back and forth movement of the load binder handle and U-pawl in the first-driving-position for continued ratcheting action in the first-rotational-direction to tighten the bind on the load. The means to insert a blocking device to block the U-pawl from moving into the second-driving-position can be one or two holes provided through one or both sides of the handle assembly located around the pivoting area of the U-pawl, the inserted blocking device therefore permitting and restricting the pivoting action of the U-pawl to a particular pivotal area for ratchet turning of the tube in the first-driving-position. Although the second-driving-position of the U-pawl is blocked, the inserted blocking device allows the normal operation of the ratchet load binder in the first-rotation-direction keeping the ability to tighten the bind on the load while the blocking device is installed in the provided set of holes. The means to insert a blocking device can be a first-set of two holes and a second-set of two holes therethrough the two sides of the handle assembly, each set of two holes in separate positions in the handle assembly. The blocking device inserted in the first-set of holes enabling and restricting the U-pawl to the first-driving-position and a small portion of the first neutral position within ⅛ inch of the gear teeth tips outside of the gear diameter. The blocking device inserted in the second-set of holes prevents the U-pawl from moving into the second-driving-position while a first spring maintains the U-pawl position in the second-neutral-position. With the U-pawl in any one of the neutral positions and after the ratchet load binder has secured a load very tight, it is very difficult or impossible to loosen the ratchet load binder by turning the tube in the second-rotational-direction by hand without the use and leverage of the attached handle. An additional tool such as a large pipe wrench to mimic the use of the load binder handle would be needed to loosen the load binder after the load binder has secured a load tightly.

The means to insert a blocking device of the disclosed invention creates a ratchet load binder that encompasses practical theft deterrent while also enabling the operator of the ratchet load binder to use the first-rotational-direction of the load binder allowing the ratchet load binder to tighten the bind on the load even when the blocking device is in place and preventing the use of the handle to turn the tube in the second-rotational-direction that would loosen the bind on the load. Even if a tool such as a large pipe wrench was used to mimic the handle and turn the tube in the second-rotational-direction, attempting to loosen the chain, the U-pawl and the first spring holding the U-pawl in position would also have to be manually pressed and held down in the first-neutral-position to remove the U-pawl from engagement with the gear in the first-rotational-direction, this action further complicating the task of unauthorized loosening of the load binder when the blocking device is in place.

On many occasions in the transportation industry, depending on road conditions the truck is traveling on, loads are known to shift and possibly loosen the load binding equipment during transport, creating the need to constantly monitor and tighten the bind on the load when required. When a truck operator transporting a load uses chains in combination with multiple ratcheting load binders described in the disclosed invention and the blocking device of each binder is in place, the ability to easily and quickly tighten the load securing chains is a very useful option when the truck operator wants to further tighten or check the tightness of the chains by ratcheting the binder in the first-rotational-direction and feeling the force of the bind without removing the blocking device on each ratcheting load binder. The above scenario saves time for the operator and prevents the inconvenience of removing the locking device as described in U.S. Pat. Nos. 9,453,557 and 6,945,516 every time the operator wants to further tighten or check the tightness of the load securing chains. In the above two cited US patents, once the locking device is inserted in the ratchet load binder either locking the gear in place in U.S. Pat. No. 9,453,557, or locking the U-pawl in an engaged position of the gear in U.S. Pat. No. 6,945,516, the back and forth action of the binder handle and pawl is no longer available for use, therefore restricting the ability to tighten the bind of a load in many instances when the full rotation of a properly positioned handle is restricted.

As an additional feature to the disclosed invention is a recessed-pawl that engages the gear in the first-driving-position when the blocking device is inserted in the first-set of holes and when the U-pawl is manually held in the first-neutral-position that allows the U-pawl to reside within ⅛ inch of the gear outside of the gear diameter while clearing the gear teeth. The recessed-pawl recesses into the U-pawl when the when the U-pawl is in the first-driving-position and forced into the gear, the recessed-pawl is pushed out of the recessed space by a second-spring when the U-pawl is not in contact with the gear, the second-spring constantly trying to push the recessed-pawl out of the recessed space of the U-pawl. The recessed-pawl purpose is to prevent the tube from turning in the second-rotational-direction if the U-pawl is manually held in the first-neutral-position within ⅛ inch of the gear outside of the gear diameter while the blocking device is inserted in the first-set of holes. The additional recessed-pawl feature further limits the unauthorized loosening and removal of the ratchet load binder by engaging the gear in the first-driving-position and preventing the turning of the tube in the second-rotational-direction when the blocking device is inserted in the first-set of holes and in the case the U-pawl is manually pressed and held out of the first-driving-position and held into the first-neutral-position restricted to no more than ⅛ of an inch from the gear teeth outside of the gear diameter. When the blocking device is inserted in the first-set of holes, the U-pawl is able to move slightly out the first-driving-position, but the U-pawl first tooth cannot move farther than ⅛ of an inch away from the gear teeth outside of the gear diameter. The second-spring will push and pivot the recessed-pawl far enough to engage the gear teeth and maintain engagement of the recessed-pawl in the first-driving-position preventing the tube from rotating in the second-rotation-direction in any instance, therefore preventing the loosening of the ratchet binder. Still another additional feature of the present invention is an obstruction-tab rigidly mounted on the gear facing side of the U-pawl preventing access to the recessed-pawl to prevent the recessed-pawl from being disengaged from the gear when the U-Pawl is held in the first-neutral-position within ⅛ inch of the gear outside of the gear diameter.

In summary, when comparing the disclosed invention to the above cited prior art US patents, the prior art devices when the locking device is installed, must have an obstruction in place to prevent the binder handle from rotating in the second rotational direction to prevent the loosening of the load binder, and if there is an obstruction in place blocking the handle rotation, the load binder cannot be tightened while the locking devices are in place, therefore causing the operator of the load binders to remove the locking devices in order to check and confirm the load securing chains are still as tight as required for transportation of the secured load. If there is no obstruction of the handle in place such as a truck deck or excess chain attached to the locking device, the handle can be turned in the first-rotational-direction or the second-rotational-direction tightening or loosening the load binder chains, therefore making the locking devices useless. The disclosed in invention does not need an additional lockable device to block the rotation of the handle in the second rotation direction to prevent the loosening of the binder chains using the handle. The present invention comprising the first-set and the second-set of holes to install a blocking device in the handle assembly is a distinct improvement of the prior art of ratchet load binders improving the usability and tamper resistance to the ratchet load binders therefore preventing the U-pawl from engaging the gear teeth in the second rotational direction preventing the use of leverage of the handle to achieve loosening of the binder chains, all the while still allowing the use of the handle and the ratchet action in the first-rotational-direction to tighten the binder chains. Adding the recessed-pawl and the obstruction tab to the ratchet load binder adds an additional level of tamper resistance preventing the second-rotation-direction of the tube in most all case while the blocking device is in the first-set of holes.

BRIEF DESCRIPTION OF THE DRAWINGS

A better understanding of the present invention will be had upon reference to the following description in conjunction with the accompanying drawings in which like numerals refer to like parts throughout the views wherein:

FIG. 3 is a side elevation section view of a prior art ratchet load binder 1 schematically showing the interior parts of the handle assembly U-pawl housing between the handle assembly sides.

FIG. 4 is a side elevation section view of the disclosed invention schematically showing the interior parts between the two handle assembly sides of the ratchet load binder. The U-pawl residing and held firmly and in the first-driving-position while still allowing the U-pawl first tooth to flexibly move around the gear teeth roots and tips.

DETAILED DESCRIPTION OF THE INVENTION

Reference Numerals

Figure 1:
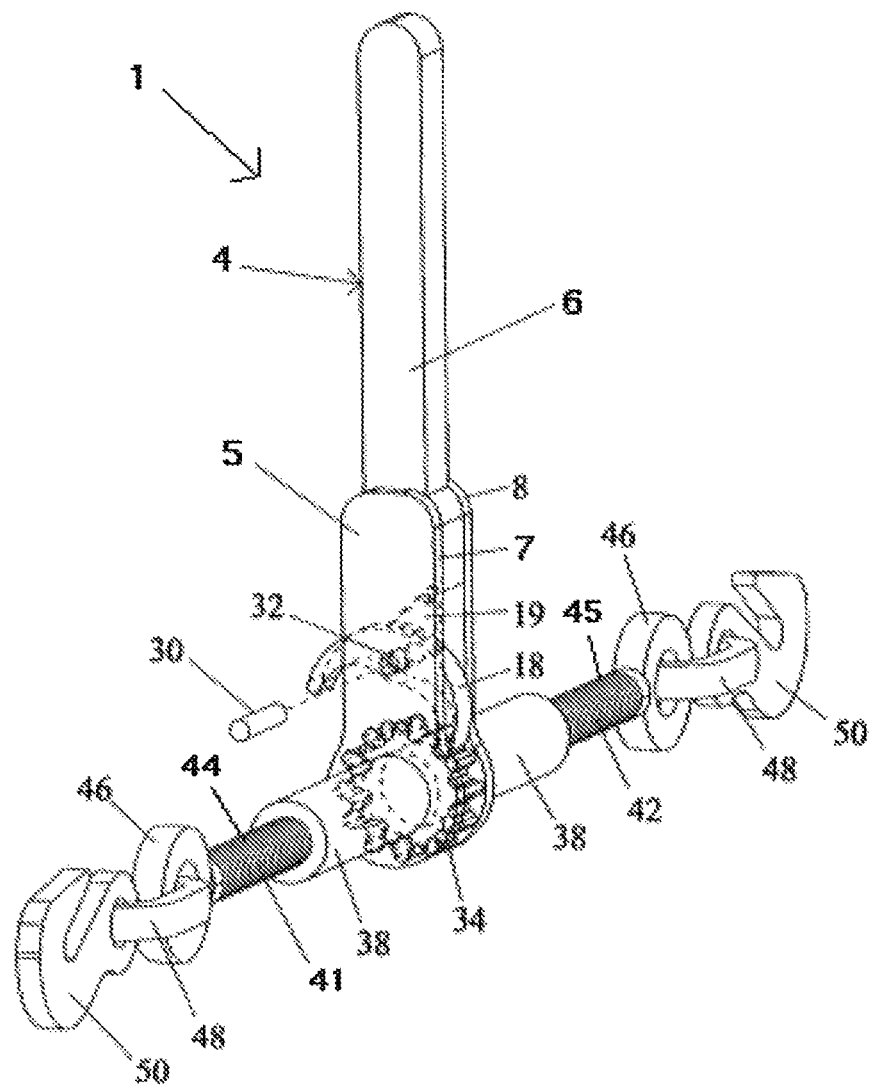
FIG. 1 is a perspective view showing a prior art ratchet load binder.

For the convenience of the reader, the following is a list of reference numbers used in this description.
- 1 Ratchet load binder—prior Art
- 2 Ratchet load binder—disclosed invention
- 4 Handle assembly
- 5 Handle assembly U-pawl housing
- 6 Handle assembly shaft
- 7 Handle assembly first side
- 8 Handle assembly second side
- 9 Handle assembly U-pawl axle hole
- 10 First spring
- 12 First spring hook
- 14 First spring stabilizer stem
- 16 First spring stabilizer stem ball end
- 18 U-Pawl
- 18a first-driving-position
- 18b first-neutral-position
- 18c second-driving-position
- 18d second-neutral-position
- 18e middle-neutral-position
- 19 U-Pawl head
- 20 U-Pawl eyelet
- 22 U-Pawl first arm
- 24 U-Pawl second arm
- 26 U-Pawl first tooth
- 28 U-Pawl second tooth
- 30 U-Pawl pivot axle
- 32 U-Pawl pivot hole
- 33 U-Pawl recessed space
- 34 Gear
- 35 Gear teeth
- 36 Gear teeth roots
- 37 Gear teeth tips
- 38 Tube
- 39 Tube first end internal threads
- 40 Tube second end internal threads
- 41 First rod
- 42 Second rod
- 44 First rod external threads, right hand threads
- 45 Second rod external threads, left hand threads
- 46 Rod eyelet
- 47 Rod first end
- 48 Rod flexible connector
- 49 Rod second end
- 50 Rod hook
- 52 First-set of holes
- 53 First hole
- 54 Second-set of holes
- 55 Second hole
- 56 Blocking device storage hole
- 57 First hole color-coding
- 58 Obstruction-tab
- 59 Second hole color-coding
- 60 Blocking device
- 62 Blocking device lock
- 64 Recessed-pawl
- 65 Recessed-pawl tooth
- 66 Recessed-pawl arm
- 68 Recessed-pawl pivot hole
- 69 U-pawl stop surface
- 70 Recessed-pawl stop surface
- 72 Second-spring
- 74 Second-spring insertion hole
- 76 U-Pawl head, narrow shape.
- 78 First set of holes, first alternate position
- 80 First set of holes, second alternate position
- 82 First set of holes, third alternate position
- 84 First rotational direction
- 86 Second rotational direction
- 88 First hole numeral
- 90 Second hole numeral
- 92 transportation vehicle
- 94 Transported load
- 96 Vehicle monitoring station
- 98 Tension-detecting-device
- 100 First-operator-communication-device
- 102 Second-operator-communication-device
- 104 Third-operator-communication-device
- 106 First-means-of-communication
- 108 Second-means-of-communication
- 110 Third-means-of-communication
- 111 Antenna
- 112 Chain for load securing
- 114 Rod extended eyelet
- 116 Tension pull direction
- 118 Contacts
- 120 Battery
- 122 Electrical wires
- 124 LED light bulb
- 126 Third set of holes
- 128 Third hole For clarity of the drawings the U-pawl position will also reflect the disclosed invention mode of operation as follows:
- "18a U-pawl first-driving-position" corresponds to turning the tube to tighten the bind on the load, with or without the blocking device installed.
- "18b U-pawl first-neutral-position" allows the tube to be freewheeled when the U-pawl is pressed against the blocking device when the blocking device in installed in the first set of holes 52 and there is no tension on the tube such as when a load is tightly bound.
- "18c U-pawl second-driving-position" corresponds to turning the tube to loosen the bind on the load with no blocking device installed.
- "18d U-pawl second-neutral-zone" corresponds to a secured U-pawl position allowing freewheeling of the gear and the tube in either the tightening or loosening direction and there is no tension on the tube such as when a load is tightly bound.
- "18e U-pawl middle-neutral-position" corresponds to an unsecured U-pawl position allowing freewheeling of the gear and the tube in either the tightening or loosening direction. This position of the U-pawl is not a usable position of the U-pawl because the U-pawl can easily fall out of this position with a slight nudge on the U-pawl in either direction of one of the U-pawls teeth.

FIG. 1 is a perspective view showing a prior art ratchet load binder 1. The handle assembly 4 comprises the handle assembly U-pawl housing 5 with a handle assembly first side 7 and a handle assembly second side 8 attached to a handle assembly shaft 6. The handle assembly comprising a shaft and two separated sides, the sides rotatably mounted around the tube to rotate completely around the tube while straddling the gear, the handle assembly generally perpendicular to the tube, the handle assembly having a first side positioned on one side of the gear and a second side positioned on the opposing side of the gear, the handle assembly first and second sides encircling the tube The U-pawl 18 is positioned between the handle assembly first side 7 and second side 8. Attached to the U-pawl 18 is the U-pawl head 19 where the first spring attaches. The U-pawl 18 pivots on the U-pawl pivot axle 30 through the U-pawl pivot hole 30. The U-pawl 18 ratchet turns the gear encircling the tube, the gear rigidly attached to the tube, the gear having externally facing teeth, the U-pawl 18 ratchet turning the tube 38 in a chosen direction. The tube 38 comprises internal threads 40 (see FIG. 5) located inside the tube 38. The tube 38 having opposing open ends and internal threads, the tube first end threads 39 are right hand internal threads and the tube second end threads 40 are left hand internal threads. A first rod 41 comprising right hand external threads 44 mating to the threads in the first end of the tube 39, the threads starting at the rod first end 47 and extending along the first rod 41, and a second rod 42 comprising left hand external threads mating to the threads in the tube second end 40, the threads starting at the rod first end 47 and extending along the second rod 42, the external threads of the first rod 41 match the tube first end internal threads 39 and the external threads of the second rod 42 match the tube second end internal threads 40, the first rod 41 threading into the first end of the tube 39, the second rod 42 threading into the second end of the tube 40. The tube 38 movable in a first-rotational-direction rotational-direction 84 and the tube 38 movable in a second-rotational-direction 86. The first-rotational-direction 84 of the tube 38 moves the rods closer to each other while the rods are stationary in rotation, the second-rotational-direction 86 of the tube 38 moves the rods farther away from each other while the rods are stationary in rotation, each rod second end 49 having a releasable connection device such as a rod hook 50. Attached to the end of the first rod 41 is a rod eyelet 46 and attached to the end of the second rod 42 is a rod eyelet 46. The rod eyelet 46 flexibly connecting to a rod flexible connector 48, and the rod flexible connector 48 is flexibly connecting to a rod hook 50. The U-pawl 18 is shown in the first-driving-position 18*a* (see FIG. 6).

Figure 2:
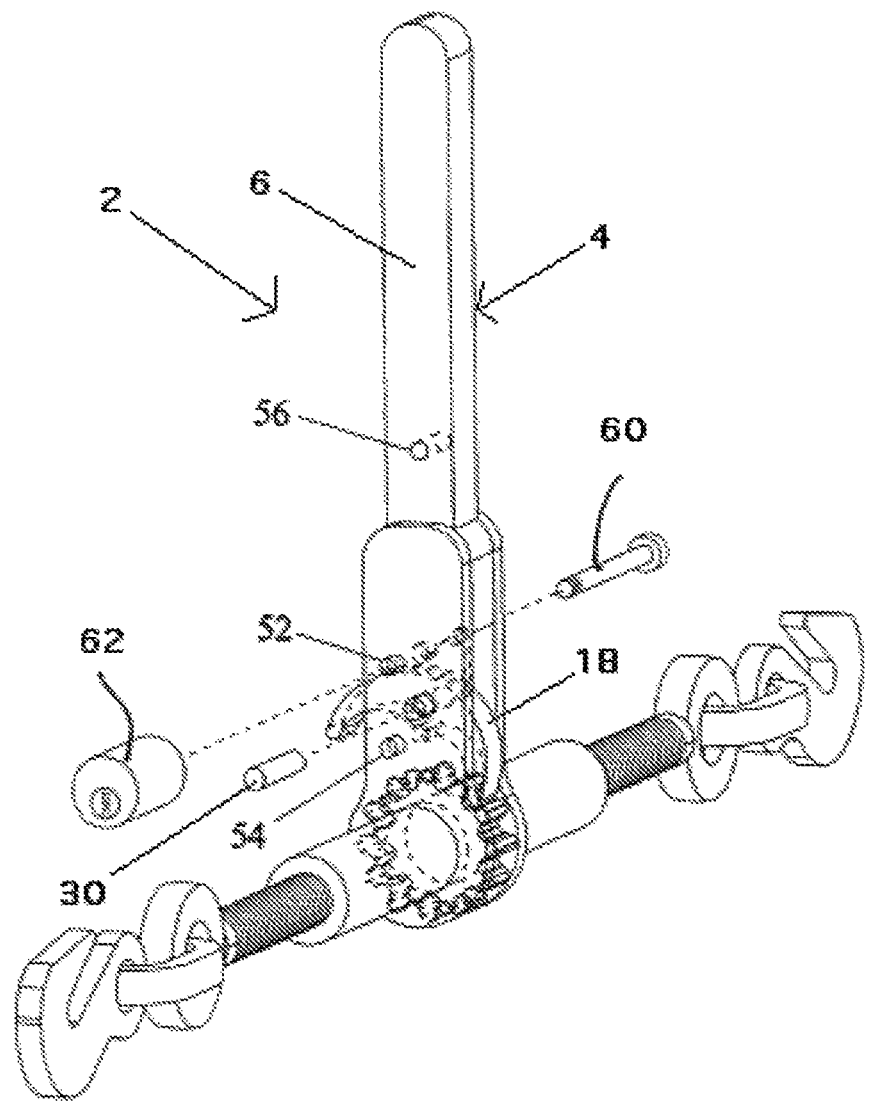
FIG. 2 is a perspective view showing the disclosed invention, the ratchet binder with the first-set of holes, the second-set of holes, the blocking device storage hole, the blocking device, and the blocking device lock.
Figure 10:
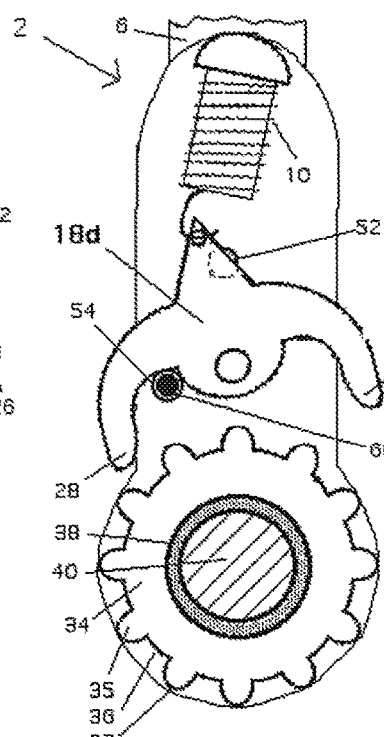
FIG. 10 is a side elevation section view of the disclosed invention schematically showing the position of the U-pawl relative to the gear and relative to the first-set and the second-set of holes. The U-pawl residing and held firmly in the second-neutral-position, the U-pawl is not in contact with the gear at any point of rotation of the gear. The blocking device is installed in the second-set of holes and not installed in the first-set of holes.
Figure 11:
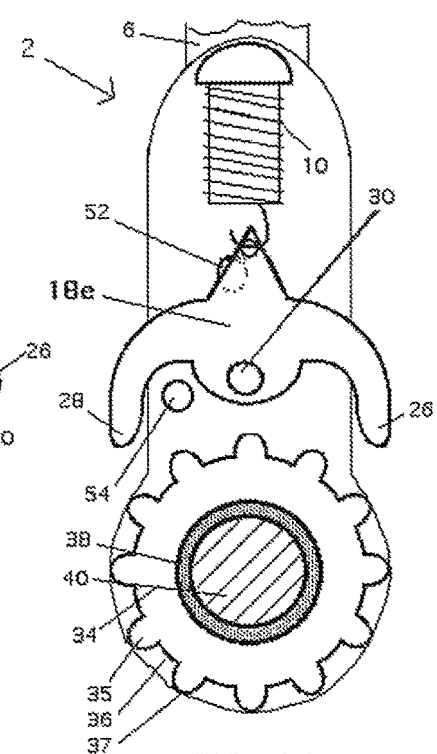
FIG. 11 is a side elevation section view of the disclosed invention schematically showing the position of the U-pawl relative to the gear and relative to first-set and the second-set of holes. The U-pawl residing in and not held firmly in the middle-neutral-position. The U-pawl is not in contact with the gear at any point of rotation of the gear. The blocking device is not installed in the first-set of holes or the second-set of holes.

FIG. 2 is a perspective view showing the disclosed invention ratchet load binder 2 comprising the prior art ratchet load binder 1 with added tamper and theft deterrence features. The tamper and theft deterrence features are the first-set of holes 52, the second-set of holes 54 and the blocking device 60 with a blocking device lock 62. The tamper and theft deterrence features are an integral part of and improvement to the prior art ratchet load binder. The blocking device 60 and the blocking device lock 62 use is enabled by the first-set of holes 52 and the second-set of holes 54. There are a multiple of blocking devices that can be used for the blocking device 60 and the blocking device lock 62 such as a padlock, a pin and a barrel lock, or a bolt head comprising a unique configuration that requires a tool with the same unique configuration to mate with the bolt head to securely install and remove the bolt. The first-set of holes 52 can accommodate a blocking device 60 to prevent the U-pawl 18 from moving from the first-driving-position 18*a* (see FIG. 6) to:

i) the U-pawl second-driving-position 18*c* (see FIG. 9);
   ii) the U-pawl second-neutral-position 18*d* (see FIG. 10);
   iii) the U-pawl middle-neutral-position 18*e* (see FIG. 11).

The blocking device 60 will prevent the U-pawl 18 and the handle assembly 4 from being used to operate the ratchet load binder 2 in the second-rotational-direction 86 (see FIG. 18), therefore preventing the handle assembly 4 and the U-pawl 18 from loosening the bind on the load.

The blocking device storage hole 56 is positioned at the base of the handle assembly shaft 6 to allow the easy operation of the handle assembly 4 with the blocking device stored in the blocking device storage hole 56 when the blocking device is not inserted in the first-set of holes or the second-set of holes. The blocking device storage hole 56 being positioned at the base of the handle assembly shaft 6 allows the ratchet load binder operator ample room to grasp the handle assembly shaft 6 without being inconvenienced by the stored blocking device 60. A blocking device lock 62 is shown removably attached to the blocking device 60 preventing the blocking device 60 from being removed from the ratchet load binder 2 without the proper key.

FIG. 3 is a side elevation section view of a prior art ratchet load binder 1 schematically showing the interior parts of the handle assembly U-pawl housing 5 between the handle assembly 4 first side 7 (see FIG. 1) and second side 8 (see FIG. 1). The handle assembly shaft 6 is shown attached to the handle assembly U-pawl assembly 5 that houses the first spring 10 that is wrapped around the first spring stabilizer stem 14 with a first spring stabilizer stem ball end 16 attached to the end of the stabilizer stem 14. The first spring stabilizer stem ball end 16 pivots at the top of the handle assembly U-pawl housing 5 as the U-pawl 18 is moved from one position to another position allowing pivotal movement of the first spring 10. The pivotal attached U-shaped-pawl 18 referred herein as a U-pawl 18 with a first tooth 22 on one end of the U-pawl 18 and a second tooth 24 on the opposing end of the U-pawl 18, the first tooth 22 for driving the rotation of the tube 38 in the first-rotational-direction 84 and the second tooth 24 for driving the rotation of the tube 38 in the second-rotational-direction 86, the U-pawl teeth 22+24 for engaging the gear teeth 35, the U-pawl 18 attached to the handle assembly between the first side 7 and the second side 8, the U-pawl 18 pivoting on an axle 30 inserted at a pivot hole 32 on the U-pawl 18, the axle 30 being attached to the handle assembly first side 7 and the second side 8 that straddles the gear 34, the pivot axle 30 on the U-pawl 18 being generally centered between the first tooth 22 and the second tooth 24 of the U-pawl 18, the U-pawl 18 having;
   i. a first-driving-position 18*a*;
   ii. a second-driving-position 18*c*; and
   iii. a middle-neutral-position 18*e*.

The first spring hook 12 attaches to the U-pawl head 19 through a U-pawl eyelet 20 allowing pivoting action of the U-pawl 18 and the first spring 10. The U-pawl first arm 22 is shown with the U-pawl first tooth 26 located at the end of the U-pawl first arm 22. The U-pawl second arm 24 is shown with the U-pawl second tooth 28 located at the end of the U-pawl second arm 24. The U-pawl pivot hole 32 is located at a center point of the U-pawl 18 to pivot on a U-pawl pivot axle 30, the U-pawl pivot axle 30 attaching to the handle assembly 4 first side 7 (not shown) and second side 8 (not identified). The U-pawl first tooth 26 is shown engaging the gear 34 between the gear teeth 35 at the gear tooth root 36 and also showing the gear teeth tips 37. The handle assembly U-pawl assembly 5 connects to the handle assembly first side 7 (not shown) and the handle assembly second side 8 (not identified). The tube 38 is shown with the tube first end internal threads 39 (not shown) and the tube second end internal threads 40. The first spring 10 applying flexible pressure on the U-pawl 18 causing the U-pawl 18 to be held securely in either the first-driving-position 18*a* or the second-driving-position 18*c*. The first spring 10 being secured in the handle assembly 4 and keeping the U-pawl 18 first tooth 26 or the second tooth 28 engaged with the gear teeth 35 during ratcheting rotation of the tube 38. The first spring 10 allowing flexible pivotal movement of the U-pawl 18 first tooth 26 or the second tooth 28 around the gear teeth roots 36 and the gear teeth tips 37 for incremental back and forth movement of the handle assembly 4 and the U-pawl 18 during the ratcheting rotational movement of the tube 38 while maintaining the U-pawl 18 first tooth 26 or the second tooth 28 in contact with the gear 34. Moving the U-pawl 18 from the first-driving-position 18a to the second-driving-position 18c or vice versa requires the U-pawl 18 to be manually and forcefully pivoted, and wherein pivoting the U-pawl 18 initially contracts the first spring 10 while moving the U-pawl 18 towards the middle-neutral-position 18e and then expands the first spring 10 when the U-pawl moves past the middle-neutral-position 18e to the opposing driving position 18a or 18c.

FIG. 4 is a side elevation section view of the disclosed invention ratchet load binder 2 comprising all of the features of the prior art ratchet load binder 1 (See FIG. 3) while also comprising the additional aligned first set of holes 52, and the additional aligned second set of holes 54. The disclosed invention ratchet load binder 2 resulting in combining the prior art ratchet load binder 1 and all of its features with the added tamper deterrent features, the first set of holes 52, and the second set of holes 54 of the ratchet load binder 2. Additional tamper deterrence features described in this entire application such as the recessed-pawl 64 (not shown) (see FIGS. 12 and 16) can also be added to the disclosed invention. The U-pawl 18 (See FIG. 3) residing and held firmly and in the U-pawl 18 first-driving-position 18a (see FIG. 6). The aligned first-set of two holes 52 positioned in the handle assembly 4 sides 7+8 (see FIG. 5) is for the insertion of the blocking device 60 wherein the insertion of the blocking device 60 in the first-set of holes 52 prevents the U-pawl 18 from pivoting from the first-driving-position 18a (See FIG. 6) into or beyond the middle-neutral-position 18e (See FIG. 11) while allowing the U-pawl movement in the first-driving-position 18a (See FIG. 6) wherein the U-pawl 18 first tooth 26 has no more than ⅛ inch of clearance away from the gear teeth tips 37 outside of the gear 34 diameter, and wherein the inserted blocking device 60 allows normal back and forth operation of the U-pawl 18 in the first-driving-position 18a (See FIG. 6) while ratchet turning the tube 38 in the first-rotational-direction 84 (See FIG. 17). Insertion of the blocking device 60 in the first-set of holes 52 and if the U-pawl 18 is held against the blocking device 60, creates:

i. a first-neutral-position 18b (See FIG. 8) of the U-pawl 18, the first-neutral-position 18b allowing freewheeling of the tube 28 in either direction and creating a clearance of the U-pawl 18 first arm 22 of about ⅛ inch or less from the gear teeth tips 37.

The ratchet load binder 2 comprising an aligned second-set of two holes 52 positioned in the handle assembly 4 sides 7+8 for the insertion of the blocking device 60 and wherein the insertion of the blocking device 60 in the second-set of holes 52 prevents the U-pawl 18 from pivoting to the second-driving-position 18c when the U-pawl 18 resides in either i) the first-driving-position 18a, ii) the first-neutral-position 18b, or iii) the middle-neutral-position 18e (See FIG. 11). The inserted blocking device 60 allows normal back and forth operation of the U-pawl 18 in the first-driving-position 18a (See FIG. 6) while ratchet turning the tube 38 in the first-rotational-direction 84. When the blocking device 60 is inserted and the U-pawl 18 is positioned against the blocking device 60, it creates:

i. a second-neutral-position 18d (See FIG. 10) of the U-pawl 18, the second-neutral-position 18d allowing freewheeling of the tube 38 in either direction. The U-pawl 18 will remain securely in the second-neutral-position 18d, the first spring 10 and the inserted blocking device 60 maintaining the U-pawl 18 position in the second-neutral-position 18d unless the U-pawl 18 is manually moved from the second-neutral-position 18d.

When the blocking device 60 (See FIG. 2) is inserted in the first-set of holes 52, the U-Pawl 18 is free to operate normally in the U-pawl first-driving-position 18a ratchet turning the tube 38 in the first-rotational-direction 84 (see FIG. 17) tightening the bind on the load, the U-pawl first tooth 26 is able to move approximately ⅛ inch into the U-pawl first-neutral-position 18b (See FIG. 8) to aid the U-pawl first tooth 26 in clearing the gear teeth tips 37 while ratchet turning the tube 38. In the event, the blocking device 60 (See FIG. 2) is inserted in the first-set of holes 52, in order to move the U-pawl first-tooth 26 off of the gear teeth tips 37 and slightly into the U-pawl 18 first-neutral-position 18b, the U-pawl 18 must be forcefully pushed into the first-neutral-position 18b (See FIG. 8) because the first spring 10 is constantly pushing the U-pawl 18 into the first-driving-position 18a (See FIG. 6) from the U-pawl first-neutral-position 18b (See FIG. 8). The normal operation of the U-Pawl 18 in the first-rotational-direction 84 includes the U-pawl 18 moving around the gear teeth roots 36 and the gear teeth tips 37 to allow back and forth movement of the handle assembly 4 and the U-pawl 18 while the U-Pawl 18 moves across the gear teeth roots 36 and gear teeth tips 37 in order to reset to a new gear tooth 35 and continue the ratchet driving and rotation of the tube 38.

When the blocking device 60 (See FIG. 10) is inserted in the second-set of holes 54, the U-Pawl 18 is free to operate normally in the U-pawl first-driving-position 18a (See FIG. 6) ratchet turning the tube 38 in the first-rotational-direction 84 (see FIG. 17) tightening the bind on the load, and again, normal operation of the U-Pawl 18 in the first-rotational-direction 84 includes the U-pawl 18 moving around the gear teeth roots 36 and gear teeth tips 37 to allow back and forth movement of the handle assembly 4 and the U-pawl 18 as the U-Pawl 18 moves across the gear teeth 35. Furthermore when the blocking device 60 (See FIG. 10) is inserted in the second-set of holes 54 the U-pawl 18 is able to be pushed to the U-pawl 18 second-neutral-position 18d (See FIG. 10) whereas it can securely reside with pressure from the first spring 10 holding the U-pawl 18 against the blocking device 60, therefore holding the U-pawl 18 position in the second-neutral-position 18d (See FIG. 10) until the U-pawl 18 is forcefully pushed out of the second-neutral-position 18d or until the blocking device 60 is removed. A function of the second-set of holes 54 is for the inserted blocking device 60 (See FIG. 10) to maintain the position of the U-pawl 18 in the second-neutral-position 18d (See FIG. 10) allowing the ratchet binder operator to freewheel spin the tube 38 and the gear 34 without the U-pawl 18 touching or obstructing the gear 34 or the tube 38 rotation. Freewheel spinning of the tube 38 allows a faster rotation of the tube 38 in either direction as compared to turning the tube 38 with the handle assembly 4 as long as there is no or little tension on the ratchet binder 2.

Figure 5:
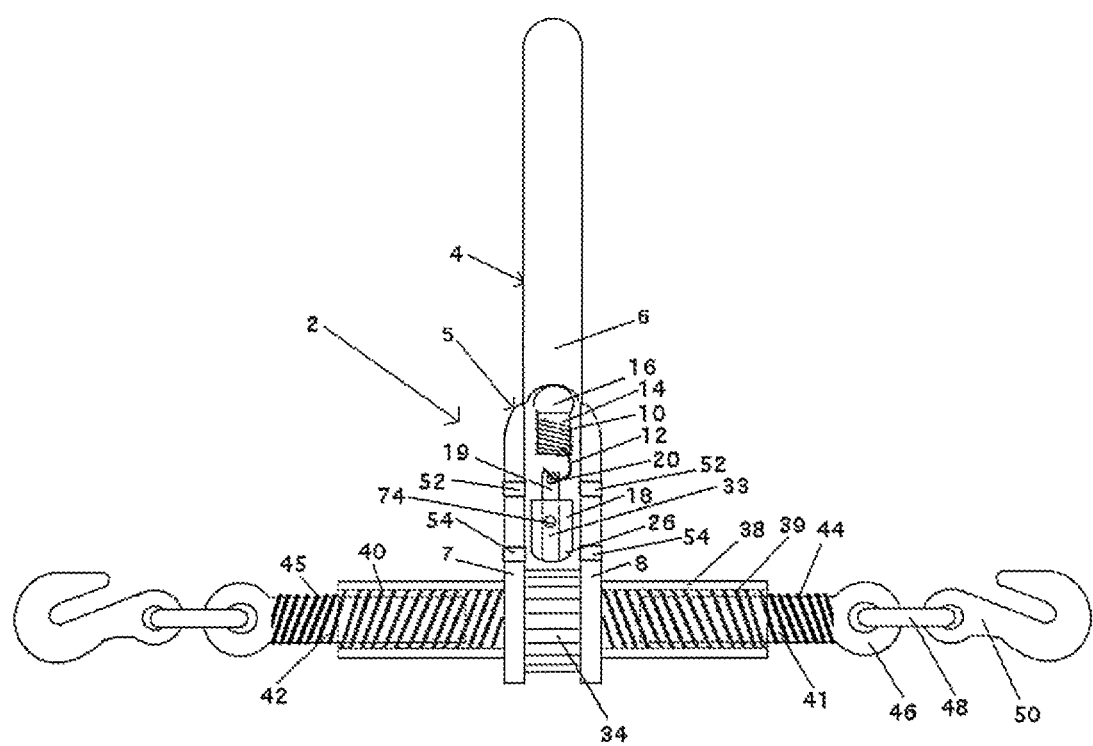
FIG. 5 is a front elevation view of the disclosed invention schematically showing the interior parts between the two sides of the ratchet load binder, showing the tube interior and the first set of holes and the second set of holes.
Figure 9:
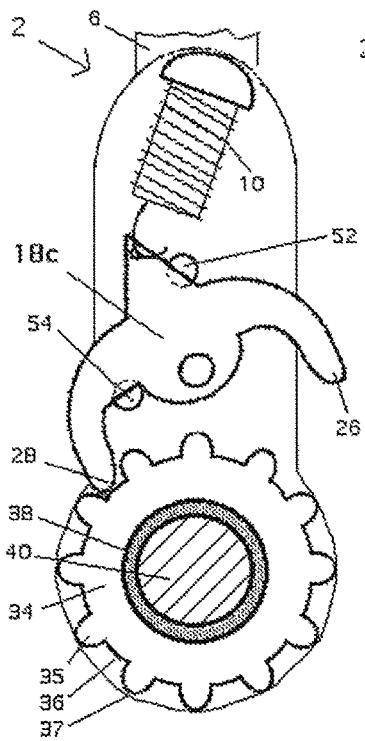
FIG. 9 is a side elevation section view of the disclosed invention schematically showing the position of the U-pawl relative to the gear and relative to the first-set and the second-set of holes. The U-pawl engaging the gear teeth root and held firmly in the second-driving-position.

FIG. 5 shows a means for applying flexible pressure on the U-pawl 18 such as a first spring 10 causing the U-pawl 18 to be held securely in either the first-driving-position 18a (see FIG. 6) or the second-driving-position 18c (see FIG. 9). A first spring stabilizer stem 14 inserted inside the first spring 10 stabilizes the position of the first spring 10 in the handle assembly 4. The flexible pressure on the U-pawl 18 keeping the U-pawl first tooth 26 or the U-pawl second tooth 28 engaged with the gear teeth 34 during the rotation of the tube 38, the means for applying flexible pressure on the U-pawl 18 allowing flexible pivotal movement of the U-pawl first tooth 26 or the second tooth 28 around the gear teeth roots 36 and the gear teeth tips 37 for incremental back and forth movement of the handle assembly 4 during the ratcheting movement of the tube 38, while maintaining the U-pawl first tooth 26 or the U-pawl second tooth 28 in contact with the gear teeth 35.

FIG. 5 is a front elevation view of the disclosed invention ratchet load binder 2 schematically showing the interior parts of the handle assembly U-pawl housing 5 between the handle assembly first side 7 and the handle assembly second side 8 and how the interior parts are positioned in relation to the first-set of holes 52 and the second-set of holes 54. Shown is the handle assembly 4 with the handle assembly shaft 6 and the handle assembly U-pawl housing 5. The tube 38 is shown with the tube first end internal threads 39 and the tube second end internal threads 40, the first rod 41 threading into the tube first end internal threads 39 with the first rod external threads 44 matching the tube first end internal threads 39, the second rod 42 threading into the tube second end internal threads 40 with the second rod external threads 45 matching the tube second end internal threads 40. The rod eyelet 46 rigidly attached to each rod second end 49, each of the first rod 41 and the second rod 42 and the rod eyelet connected flexibly to the rod flexible connector 48, the rod flexible connector 48 flexibly connected to the rod hook 50. The rod hook 50 is configured to attach to a chain link or a combination of chain-links. The first set of holes 52 is shown with no blocking device 60 (see FIG. 2) installed. The second set of holes 54 is shown with no blocking device 60 (see FIG. 2) installed. The U-pawl 18 is shown with the U-pawl first tooth 26 and the U-Pawl recessed space 33 (shown in dotted lines portraying hidden in this drawing). The U-pawl head 19 is shown with the U-pawl eyelet 20 receiving the first spring hook 12 through the U-pawl eyelet 20. The first spring 10 is wrapped around the first spring stabilizer stem 14 and the first spring stabilizer stem 14 is attached to the first spring stabilizer stem ball end 16. The gear 34 is shown rigidly attached to the tube. The first-set of holes 52 and the second-set of holes 54 each can comprise one threaded hole and one non-threaded hole being a slip hole. The blocking device 60 can be lockable and comprise a shackle. The shackle can be a pin or a shackle of a padlock. The blocking device 60 can be extendable and retractable such as an extendable lock attached to the handle assembly 4. The blocking device 60 can be a barrel lock attached to the pin and wherein the pin is grooved to accommodate the barrel lock locking mechanism. The blocking device 60 can be a threaded bolt comprising a shaft with a head end, and a threaded end. A blocking device 60 pin can have a pin stop end that is recessed into the handle assembly 4.

Figure 6:
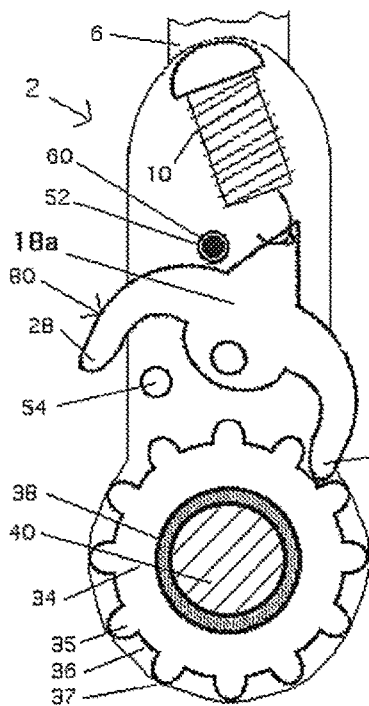
FIG. 6 is a side elevation section view of the disclosed invention schematically showing the position of the U-pawl relative to the gear and relative to the first-set of holes and the second-set of holes. The U-pawl engaging the gear teeth root and held firmly in the first-driving-position.

FIG. 6 is a side elevation section view of the disclosed invention with the U-pawl 18 positioned in the first-driving-position 18a and schematically showing the position of the U-pawl 18 relative to the gear 34 and relative to the first-set of holes 52 and relative to the second-set of holes 54. The blocking device 60 is installed in the first-set of holes 52. The U-pawl 18 engaging the gear teeth root 36 and held firmly in the first-driving-position 18a by the first spring 10 while allowing the U-pawl first tooth 26 to flexibly move around the gear teeth roots 36 and gear teeth tips 37. The blocking device 60 is not installed in the second-set of holes 54, therefore, the U-pawl 18 may not be moved out of this first-driving-position 18a. When using the disclosed invention ratchet chain binder 2 to bind a load on a truck deck, the most common and useful insertion of the blocking device 60 is in the first-set of holes 52. The insertion of the blocking device 60 is in the first-set of holes 52 allows the ratchet binder 2 operator to tighten or re-tighten the load at any time without removing the blocking device. In addition, with the blocking device 60 securely locked in place in the first-set of holes 52, the U-pawl 18 cannot be moved out of the first-driving-position 18a or moved out of the first-neutral-position 18b (see FIG. 8), making the bind on the load virtually impossible to loosen without an additional tool such as a pipe wrench to turn the tube 38 in the second-rotational-direction 86 while also concurrently manually holding the U-pawl 18 in the first-neutral-position 18b (see FIG. 8), irregardless of the first spring 10 constantly pressuring the U-pawl 18 into the first-driving-position 18a (see FIG. 6).

Figure 7:
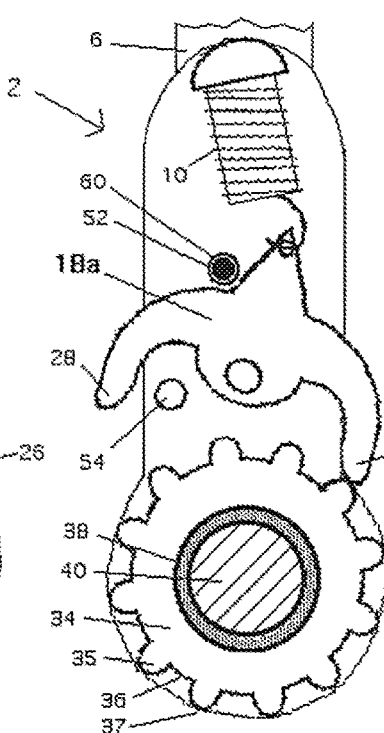
FIG. 7 is a side elevation section view of the disclosed invention schematically showing the position of the U-pawl relative to the gear and relative to the first-set of holes and the second-set of holes. The U-pawl moving around the gear teeth tips and held firmly in the first-driving-position.

FIG. 7 is a side elevation section view of the disclosed invention with the U-pawl 18 positioned in the first-driving-position 18a (see FIG. 6) and schematically showing the position of the U-pawl 18 relative to the gear 34 and relative to the first-set of holes 52 and relative to the second-set of holes 54. The U-pawl 18 is shown riding on the gear teeth tip 37 and held firmly in the first-driving-position 18a by the first spring 10 while allowing the U-pawl first tooth 26 to flexibly move around the gear teeth roots 36 and gear teeth tips 37. The blocking device 60 is installed in the first-set of holes 52 and the blocking device 60 is not installed in the second-set of holes 54, therefore, the U-pawl 18 may not be moved out of and remain out of the first-driving-position 18a unless external force holds the U-pawl 18 in the first-neutral-position 18b (see FIG. 8). If the U-pawl 18 is moved from the first-driving-position 18a to the first-neutral-position 18b with external force, the U-pawl 18 will return to the first-driving-position 18a when the external force is removed.

Figure 8:
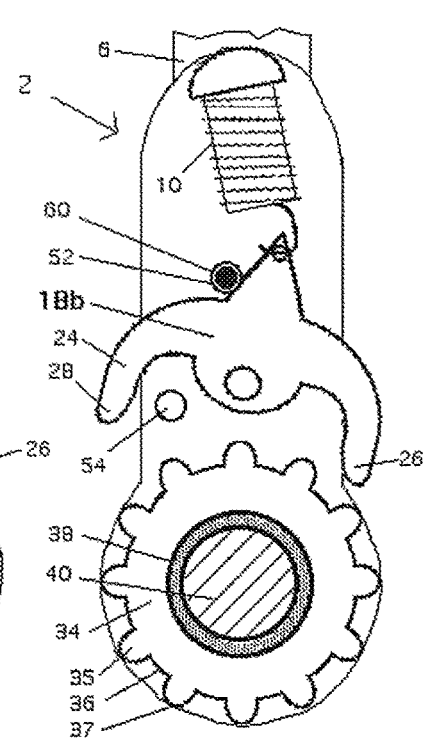
FIG. 8 is a side elevation section view of the disclosed invention schematically showing the position of the U-pawl relative to the gear and relative to the first-set and the second-set of holes. The U-pawl residing in the first-neutral-position, the U-pawl is not in contact with the gear at any point of rotation of the gear. The blocking device is installed in the first-set of holes and not installed in the second-set of holes.

FIG. 8 is a side elevation section view of the disclosed invention with the U-pawl 18 positioned in the first-neutral-position 18b and schematically showing the position of the U-pawl 18 relative to the gear 34 and relative to the first-set of holes 52 and relative to the second-set of holes 54. The U-pawl 18 is residing in the first-neutral-position 18b and the U-pawl head 19 is manually held against the blocking device 60, the U-pawl 18 is not in contact with the gear 34 and the U-pawl 18 is being held in the U-pawl 18 first-neutral-position 18b by external force on the U-pawl second arm 24, therefore holding the U-pawl 18 in the first-neutral-position 18b irregardless of the pressure from the first spring 10 attempting to force the U-pawl 18 into the first-driving-position 18a. The blocking device 60 is installed in the first-set of holes 52 limiting the U-pawl 18 to ⅛ inch away from the gear tooth tip 37 outside of the gear 34 diameter. The blocking device 60 is not installed in the second-set of holes 54. When the U-pawl 18 is in the first-neutral-position 18b, the gear 34 and tube 38 can be freewheeled by hand in either the first-rotational-direction 84 (see FIG. 17), or the second rotational direction 86 (see FIG. 18), therefore tightening or loosening the bind on the load while the bind is already loose, although, if the bind on the load is already tight and secure, freewheeling the gear 34 and the tube 38 by hand would be virtually impossible because of the tension on the ratchet binder 2 restricting rotational movement of the tube 38. The U-pawl 18 would need to be positioned into the first driving position 18a in order to tighten the bind on the load (this would happen automatically when the external force being applied to the U-pawl second arm 24 is removed), in order to loosen an already tightly bound load, a tool such as a pipe wrench would be necessary turn manually turn the tube 38 in the second-rotational-direction 86 to loosen the bind on the load when the blocking device 60 is installed in the first set of holes 52, all the while manually holding the U-pawl 18 in the first-neutral-position 18b to oppose the pressure from the first spring 10, creating a situation wherein the loosening of the bind on the load while the U-pawl 18 is in the first-neutral-position 18b is unlikely and difficult. Further security that the bind on the load would not be loosened when the U-pawl 18 is in the first-neutral-position 18b can be achieved by employing the recessed pawl 64 (see FIGS. 12 and 13).

FIG. 9 is a side elevation section view of the disclosed invention with the U-pawl 18 positioned in the second-driving-position 18c and schematically showing the position of the U-pawl 18 relative to the gear 34 and relative to the first-set of holes 52 and relative to the second-set of holes 54. The U-pawl 18 engaging the gear teeth root 36 and held firmly in the second-driving-position 18c by the first spring 10 while allowing the U-pawl first tooth 26 to flexibly move around the gear teeth roots 36 and gear teeth tips 37. The blocking device 60 (see FIG. 2 and FIG. 10) is not installed in the first-set of holes 52 or the second-set of holes 54, therefore, the U-pawl 18 may be moved out of the second-driving-position 18c with force.

FIG. 10 is a side elevation section view of the disclosed invention second-neutral-position 18d schematically showing the position of the U-pawl 18 relative to the gear 34 and relative to the first-set of holes 52 and the second-set of holes 54. The U-pawl 18 residing in the second-neutral-position 18d. The U-pawl 18 is not in contact with the gear 34 and the U-pawl 18 is being held in the second-neutral-position 18d by the first spring 10, the first spring 10 is holding the U-pawl 18 against the blocking device 60, the blocking device 60 installed in the second set of holes 54. The second-neutral-position 18d is secure in its holding ability to allow the U-pawl 18 to stay in position while allowing the gear 34 and the tube 38 to be freewheeled by hand in either the first-rotational-direction 84 (see FIG. 17), or the second rotational direction 86 (see FIG. 18), therefore tightening or loosening the bind on the load while the bind is already loose, although, if the bind on the load is already tight and secure, freewheeling the gear 34 and the tube 38 by hand would be near impossible because of the tension on the tube 38. The blocking device 60 being installed in the second set of holes 54 would normally be done after the bind on the load has just been loosened and the ratchet chain binder 2 is ready to be removed from the truck bed and the load, the ratchet binder 2 would now be free wheeled and completely loosened for removal from the truck bed and from the load. Next the ratchet binder 2 could be stored with the blocking device 60 still locked in the second set of holes 54 during storage, then, when the next load is set to be bound on the truck bed, the ratchet binder 2 with the blocking device 60 still locked in the second set of holes 54 can be positioned on the truck bed and hooked to the load by itself of with the use of a chain, then the ratchet binder 2 can be freewheeled to remove the slack from the ratchet binder and/or the chain prior to removing the blocking device 60 from the second set of holes 54 and then installing the blocking device 60 into the first set of holes 52 to complete the final tightening of the ratchet binder to the load for transport of the load. With the blocking device 60 installed and locked in the first set of holes 52, the truck driver can check the tightness or tighten the ratchet binder 2 in the first-rotational-direction 84 (see FIG. 17) very easily without removing the blocking device 60 from the first set of holes 52, although to loosen the ratchet binder 2 without using additional tools such as a pipe wrench, the blocking device 60 would need to be removed from the first set of holes 52 to allow the U-pawl 18 to be forced into the second-driving-position 18c allowing the operator to use the handle assembly shaft 6 to loosen the bind on the load. As mentioned previously, further security that the bind on the load would not be loosened when the U-pawl 18 is in the first-neutral-position 18b can be achieved by employing the recessed pawl 64 (see FIGS. 12 and 13).

FIG. 11 is a side elevation section view of the disclosed invention middle-neutral-mode 18e schematically showing the position of the U-pawl 18 relative to the gear 34 and relative to the first-set of holes 53 and the second-set of holes 54. The U-pawl 18 residing in and not held firmly in the middle-neutral-position 18e. The blocking device is not installed in the first-set of holes 52 or the second-set of holes 54. The U-pawl 18 middle-neutral-position 18e is a balancing act on the U-pawl pivot axle 30, nudging the U-pawl 18 into first-driving-position 18a or into the second-driving-position 18c will result in the U-pawl 18 engaging the gear.

Figure 12:
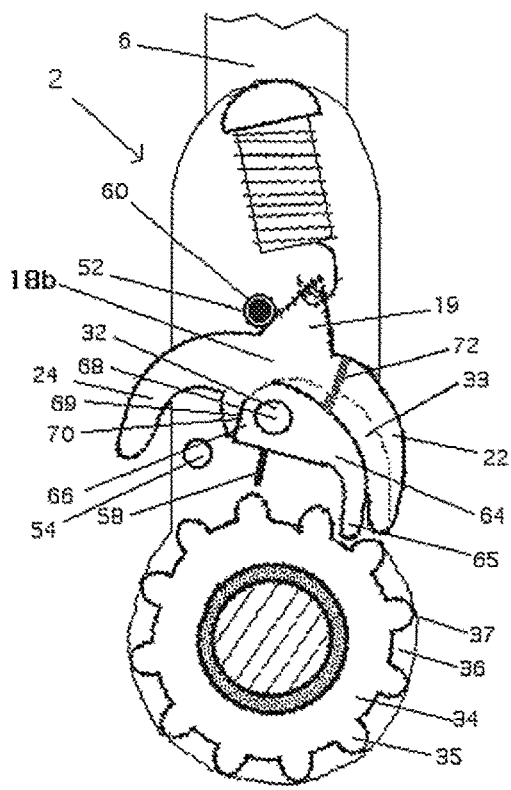
FIG. 12 is a side elevation section view of the disclosed invention schematically showing the first-set of holes and the second-set of holes for the blocking device and also showing the recessed-pawl pushed out of the recessed space of the U-pawl. The U-pawl residing in the first-neutral-position, the U-pawl is not in contact with the gear at any point of rotation of the gear. The blocking device is installed in the first-set of holes and not installed in the second-set of holes. The recessed pawl engaging the gear teeth root and held firmly in the first-driving-position.

FIG. 12 is a side elevation section view of the disclosed invention wherein the U-pawl 18 is positioned in the first-neutral-position 18b schematically showing the first-set of holes 52 and the second-set of holes 54, the blocking device 60 inserted in the first set of holes 52. The recessed-pawl 64 is shown engaging the gear teeth root 36 as the U-pawl 18 is being forcefully held in the first-neutral-position 18b, the blocking device 60 keeping the U-pawl 18 first tooth 26 from moving more than ⅛ inch away from the gear tooth tip 37 outside of the gear 34 diameter. The recessed-pawl 64 pivots on the U-pawl pivot axle 30 (see FIG. 2). The recessed-pawl 64 pivots partially independently from the pivot action of the U-pawl 18. The U-pawl 18 recessed space 33 is shown in the gear facing side of the first tooth 26 and wherein the recessed space 33 encircles the pivot axle 30 of the U-pawl 18 while partially recessing into the second arm 24 of the U-pawl 18. The recessed-pawl 64 comprises a single tooth 65 and the recessed-pawl 64 is partially or fully recessed in the recessed space 33 of the U-pawl 18, the recessed-pawl arm 66 and the recessed-pawl tooth 65 able to move in and out of the recessed space 33 of the U-pawl, the recessed-pawl arm 66 and the recessed-pawl tooth 65 constantly being pressured and pushed towards the gear 34 by a second spring 72 supported by the U-pawl 18, the recessed-pawl 64 utilizing the same U-pawl for a pivot axle 30 as the U-pawl for a pivot point, the recessed-pawl 64 being pushed towards and making contact with the gear 34 somewhere including of and between the gear teeth tips 37 and the gear teeth roots 36 when the U-pawl 18 first tooth 26 is within ⅛ inch or less of the gear teeth tips 37 outside of the gear diameter; The recessed-pawl 64 is shown moved out of the U-pawl recessed space 33 and into the gear teeth root 36 by the force of the second spring 74. The second spring 74 being recessed into the U-pawl first arm 22 by a hole drilled into the underside of U-pawl first arm 22. The U-pawl head 19 is shown held against the blocking device 60 and cannot move beyond the blocking device 60. The obstruction tab 58 is shown rigidly attached to the underside of the U-pawl 18 and does not come in contact with the gear 34 in any position the U-pawl 18 is in. The obstruction tab 58 deters tampering with the recessed-pawl 64 when the recessed-pawl 64 is engaged with the gear teeth roots 36 and when the U-pawl 18 is not engaged with the gear teeth roots 36. The recessed-pawl 64 prevents the tube from moving in the second-rotational-direction 86 (see FIG. 18) when the recessed-pawl 64 is engaged with the gear teeth roots 36 while the blocking device 60 is inserted in the first-set of holes 52. The recessed-pawl 64 utilizing a U-pawl stop surface 69 that mates with a surface of the recessed-pawl 64 to stop the pivot of the recessed-pawl 64 at any point in excess of the measurement from the fully recessed position of the recessed-pawl 64 tooth in the recessed space 33 of the U-pawl 18 to an aligned gear teeth root 36 when the U-pawl 18 is held in the first-neutral-position 18*b* (see FIG. 12) and wherein the U-pawl first tooth 26 is at least ⅛ inch away from the gear teeth tips 37 outside of the gear 34 diameter, the recessed-pawl 64 preventing the tube 38 from turning in the second-rotational-direction 86 (see FIG. 18) if the U-pawl 18 if held in the first-neutral-position 18*b* while the U-pawl 18 first tooth 26 maintains a position of ⅛ inch or less from the gear teeth tips 37 outside of the gear 34 diameter.

Figure 17:
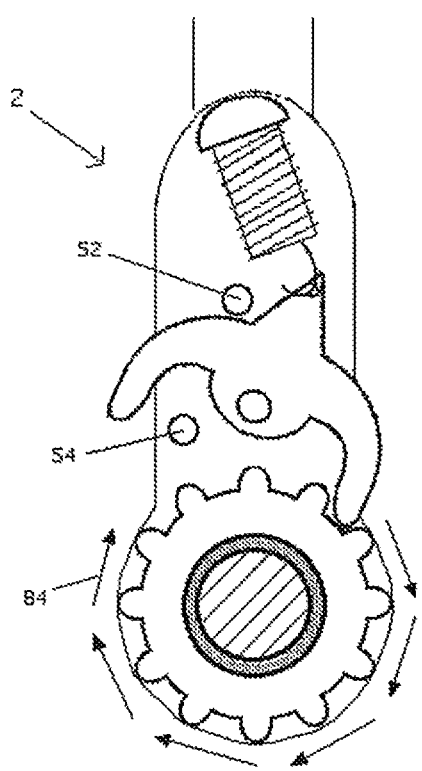
FIG. 17 is a side elevation section view of the disclosed invention first-rotational-direction of the gear and the tube.

The first spring 10 will exert more force than the second spring 72 resulting in the recessed-pawl 64 remaining substantially recessed in the U-pawl 18 during the ratchet turning of the tube in the first-rotational-direction 84 (see FIG. 17). The first spring 10 exerting substantial force on the U-pawl 18 to quickly engage the U-pawl 18 in the gear teeth roots 36 when the U-pawl 18 and the recessed-pawl 64 are moving around the gear teeth 35 while ratchet turning the tube 38 in the first-rotational-direction 84. To aid the recessed-pawl 64 to remain substantially recessed in the U-pawl recessed space 33 during ratchet turning the tube 38 in the first-rotational-direction 84, the recessed-pawl 64 will be the same length or slightly longer in length than the U-pawl first arm 22 resulting in both the recessed-pawl 64 and the U-pawl first arm 22 dropping off of the gear teeth tips 37 at the same time and then moving to the gear teeth roots 36 to engage the gear 34 and then turn the tube 38 in the first-rotational-direction 84. The obstruction tab 58 is shown clear of the gear teeth 35 while the U-pawl 18 is in the first-neutral-position 18*b*. The obstruction tab 58 will deter an outside force such as a screwdriver from pushing the recessed-pawl 64 back into the U-pawl recessed space 33 therefore removing the recessed-pawl 64 engagement from the gear teeth 35. If the recessed-pawl 64 is removed from the engagement of the gear teeth 35, the tube 38 can freewheel turn in either the first-rotational-direction 84 or the second-rotational-direction 86.

Figure 13:
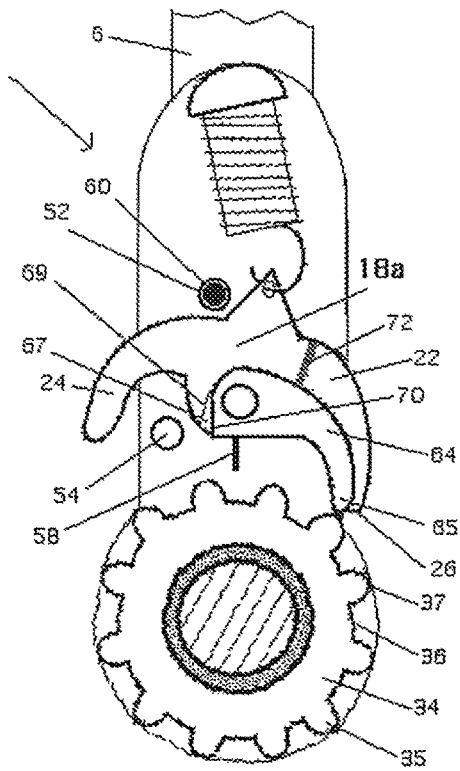
FIG. 13 is a side elevation section view of the disclosed invention schematically showing the first-set of holes and the second-set of holes, the blocking device inserted in the first set of holes. The U-pawl residing in the U-pawl first-driving-position. The recessed pawl recessed in the U-pawl as the recessed-pawl resides on a gear tooth tip.

FIG. 13 is a side elevation section view of the disclosed invention schematically showing the first-set of holes 52 and the second-set of holes 54, the blocking device 60 inserted in the first set of holes 52. The U-pawl 18 residing in the first-driving-position 18*a* with both the recessed-pawl tooth 65 and the U-pawl first tooth 26 moving across the gear teeth tips 37, the recessed-pawl 64 being recessed in the U-Pawl recessed space 33. The U-pawl head 19 is not in contact with the blocking device 60 during the normal operation of the U-pawl first driving position 80. The recessed-pawl stop surface 70 is not engaged with the U-pawl stop surface 69 when the recessed-pawl 64 is recessed in the U-pawl 18. When the recessed-pawl stop surface 70 is engaged with the U-pawl stop surface 69, the recessed pawl 64 will be extended out of the U-Pawl recessed space 33 until the two stop surfaces 70 and 69 meet. (See FIG. 12) The U-Pawl recessed space 33 is shown on the U-pawl second arm 24 side of the U-pawl 18. The U-pawl 18 comprises an obstruction tab 58 attached to the gear 34 facing second arm 24 portion of the U-pawl 18, the obstruction tab 58 discouraging the manually pushing of the recessed-pawl tooth 65 into the recessed space 33 of the U-pawl 18 when the U-pawl 18 is held in the first-neutral-position 18*b* and when the U-pawl 18 first tooth 26 is within ⅛ inch of the gear teeth tips 37 outside of the gear 34 diameter.

Figure 14:
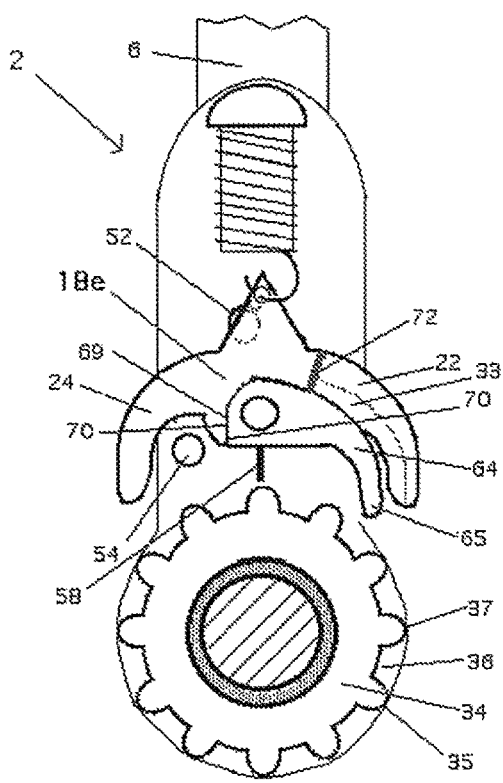
FIG. 14 is a side elevation section view of the disclosed invention schematically showing the first-set of holes and the second-set of holes, the U-pawl residing in the U-pawl middle-neutral-position. The second spring is shown in an extended position while the recessed-pawl is pushed out of the U-pawl recessed space.
Figure 18:
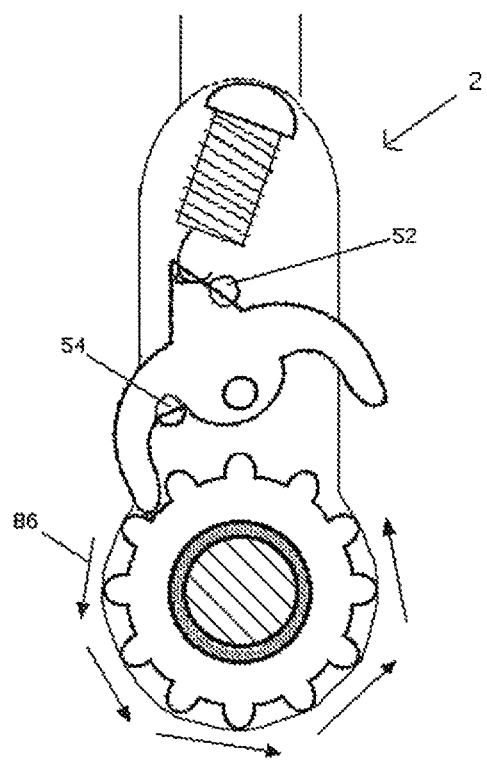
FIG. 18 is a side elevation section view of the disclosed invention second-rotational-direction of the gear and the tube.

FIG. 14 is a side elevation section view of the disclosed invention schematically showing the first-set of holes 52 and the second-set of holes 54, the U-pawl 18 residing in the U-pawl middle-neutral-position 18*e* allowing the gear 34 to be uninhibited from the U-Pawl 18 and the gear 34 able to freewheel turn in either the first-rotational-direction 84 (see FIG. 17) or the second-rotational-direction 86 (see FIG. 18). The recessed-pawl stop surface 70 is engaged with the U-pawl stop surface 69 when the recessed-pawl 64 is not recessed in the U-pawl recessed space 33 (see FIG. 16). The obstruction tab 58 is shown rigidly attached to the underside of the U-pawl 18 and does not come in contact with the gear 34 in any position the U-pawl 18 is in. The second spring 72 is shown in an extended position while the recessed-pawl 64 is pushed out of the U-pawl recessed space 33. The middle-neutral-position 18*e* of the U-pawl 18 is not securely held in position and if the U-pawl 18 is positioned in the middle-neutral-position 18*e* the U-pawl 18 is likely to move to the first-driving-position 18*a* or the second-driving-position 18*c* with a slight nudge towards the corresponding position (18*a* or 18*c*), in addition, if the U-pawl 18 is located in the first-neutral-position 18*b* or the second-neutral-position 18*d* and if the U-pawl 18 is not held in place by an exterior force or object, the U-pawl 18 will move into the corresponding first-driving-position 18*a* or the second-driving-position 18*c* by the first spring 10 pressure on the U-pawl 18.

Figure 15:
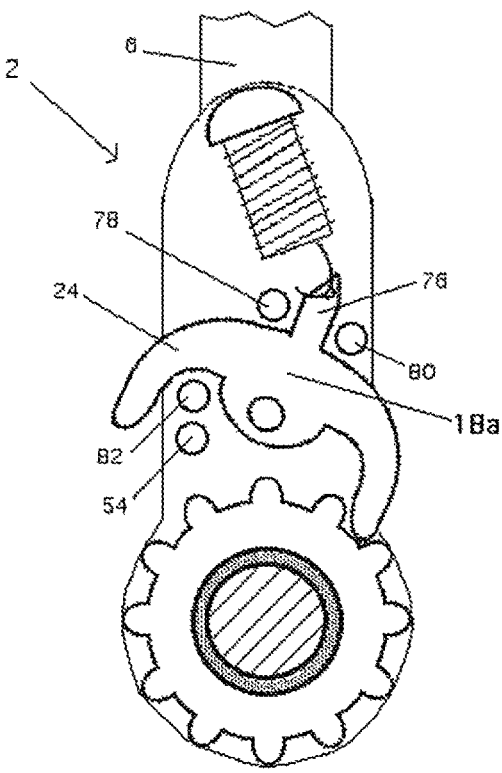
FIG. 15 is a side elevation section view of the disclosed invention first-driving-position schematically showing the U-pawl head narrow shape and three alternate locations of the first set of holes.

FIG. 15 is a side elevation section view of the disclosed invention first-driving-position 18*a* schematically showing the U-pawl head narrow shape 76 and three alternate locations for the first set of holes 52 (see FIG. 13). The first set of holes, first alternate location 78 is the closest to the original first set of holes 52 (see FIG. 13) and is positioned near the U-pawl head, narrow shape 76. The first set of holes, second alternate location 80 is positioned on the opposing side of the U-pawl head, narrow shape 76. The first set of holes, third alternate location 82 is positioned below the U-pawl second arm 24.

Figure 16:
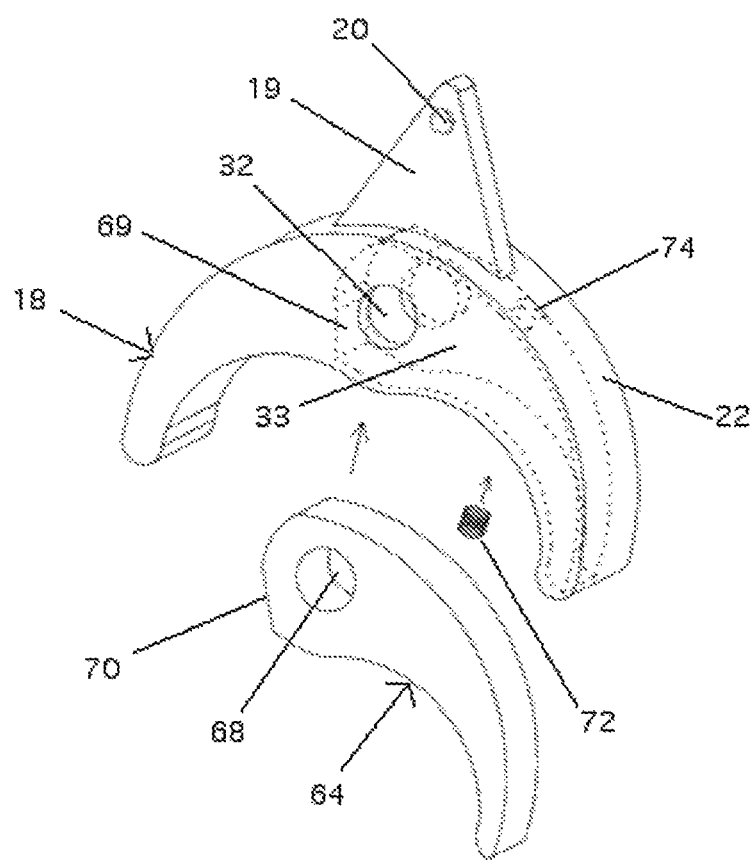
FIG. 16 is a perspective view of the U-pawl and the recessed-pawl showing the position of the U-Pawl recessed space.

FIG. 16 is a perspective view of the U-pawl 18 and the recessed-pawl 64 showing the position of the U-Pawl recessed space 33. The second spring insertion hole 74 is shown in the U-pawl 18, this hole can be a drilled hole drilled from the underside of the U-pawl 18 stopping just underneath the surface of the U-pawl 18 requiring the second spring 72 to be inserted between the U-pawl 18 and the recessed-pawl 64 while the two pawls are disassembled. In an alternative drilling of the second spring insertion hole 74 and insertion of the second spring 72, the hole can be drilled through the top portion of the U-pawl 18 all the way through and into the U-Pawl recessed space 33 allowing for the second spring 72 to be inserted in the second spring insertion hole 74 while the U-pawl 18 and the recessed-pawl 64 are assembled together, then after the second spring 72 is inserted in the second spring insertion hole 74 a plug can be installed above the spring and secured level with the top of the U-pawl 18. The U-pawl recessed space 33 encircles a portion of the U-pawl pivot hole 32 allowing the recessed-pawl 64 to fit in the U-pawl recessed space 33 while leaving enough material in the U-pawl first arm 22 to maintain a sturdy structure. The U-pawl stop surface 69 is shown in the U-pawl recessed space 33 and the recessed-pawl stop surface is shown on the recessed-pawl 64. The U-pawl head 19 is shown mounted to the top of the U-pawl 18 with the U-pawl eyelet 20 at the top of the U-pawl head 19. The recessed-pawl pivot hole 68 will align with the U-pawl pivot hole 32.

FIG. 17 is a side elevation section view of the disclosed invention first-rotational-direction 84 of the gear and the tube.

FIG. 18 is a side elevation section view of the disclosed invention second-rotational-direction 86 of the gear and the tube.

Figure 19:
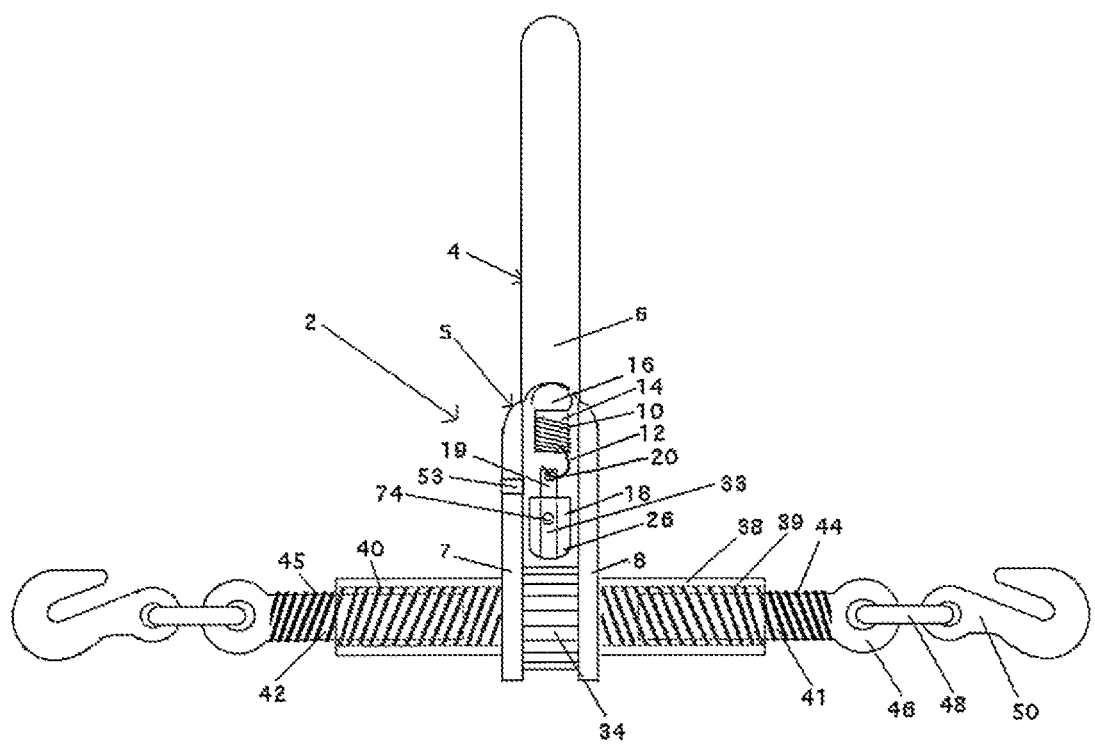
FIG. 19 is a front elevation view of the disclosed invention schematically showing the interior parts between the two sides of the ratchet load binder and showing the first hole in the handle assembly first side.

FIG. 19 is a front elevation view of the disclosed invention schematically showing the interior parts between the two sides of the ratchet load binder and showing the first hole 53 in the handle assembly first side 7. The first hole 53 generally is a threaded hole to accommodate and hold the blocking device 60 in place. A blocking device 60 that can be used to insert in the first hole 53 may be a threaded bolt comprising a bolt head wherein the bolt head has a unique configuration that requires a tool with the same unique configuration to mate with the bolt head to securely install and remove the bolt. The first-hole positioned in the handle assembly side 7 for the insertion of a blocking device 60 wherein the insertion of the blocking device 60 in the first-hole 53 prevents the U-pawl 18 from pivoting from the first-driving-position 18*a* into or beyond the middle-neutral-position 18*e* while allowing the U-pawl 18 movement in the first-driving-position 18*a* wherein the U-pawl 18 first tooth 26 has no more than ⅛ inch of clearance away from the gear teeth tips 37 (see FIG. 4) outside of the gear 34 diameter, and wherein the inserted blocking device 60 allows normal back and forth operation of the U-pawl 18 in the first-driving-position 18*a* while ratchet turning the tube 38 in the first-rotational-direction 84. Insertion of the blocking device 60 in the first-hole 53 and if the U-pawl 18 is held against the blocking device 60, creates:

i. a first-neutral-position 18*b* (see FIG. 8) of the U-pawl, the first-neutral-position 18*b* allowing freewheeling of the tube 38 in either direction and creating a clearance of the U-pawl 18 first arm 22 of about ⅛ inch or less from the gear teeth tips 37 (see FIG. 4).

Figure 20:
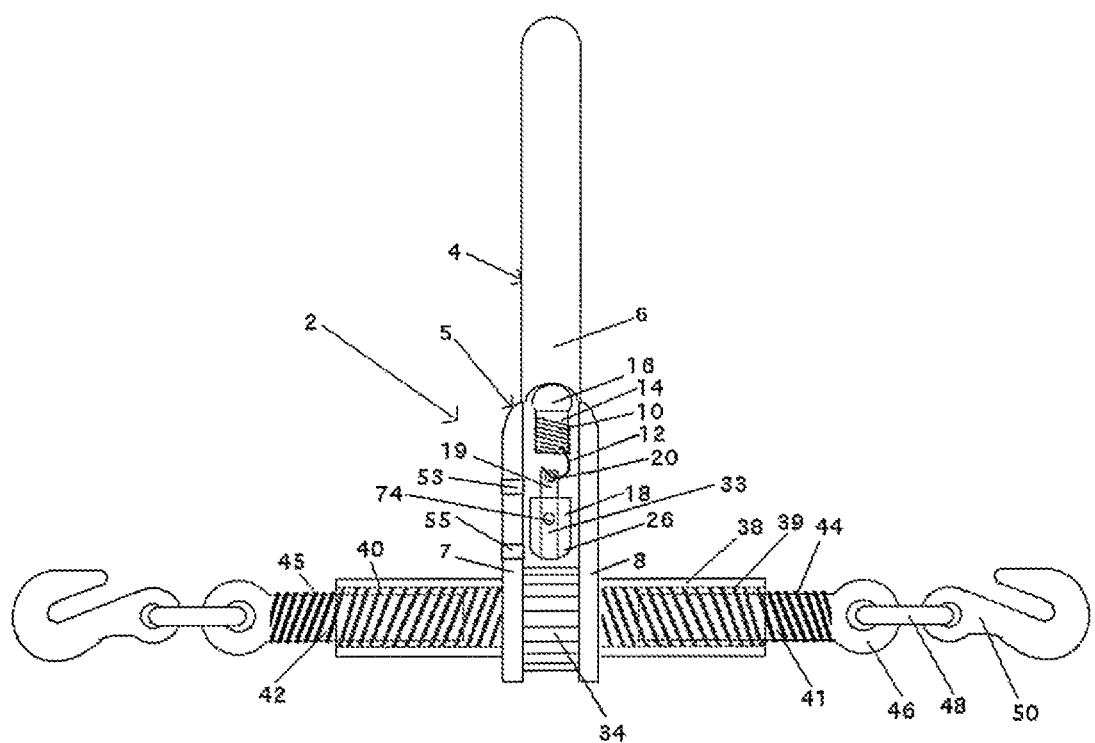
FIG. 20 is a front elevation view of the disclosed invention schematically showing the interior parts between the two sides of the ratchet load binder and showing the second hole in the handle assembly first side.

FIG. 20 is a front elevation view of the disclosed invention schematically showing the interior parts between the two sides of the ratchet load binder and showing the first hole 53 and the second hole 55 in the handle assembly first side 7. The first hole 53 and the second hole 55 generally are threaded holes to accommodate and hold the blocking device 60 in place. A blocking device 60 that can be used to insert in the first hole 53 and the second hole 55 may be a threaded bolt comprising a bolt head wherein the bolt head has a unique configuration that requires a tool with the same unique configuration to mate with the bolt head to securely install and remove the bolt. The second-hole 55 positioned in the handle assembly sides 7+8 for the insertion of the blocking device 60 and wherein the insertion of the blocking device 60 in the second-hole 55 prevents the U-pawl 18 from pivoting to the second-driving-position 18*c* (see FIG. 9) when the U-pawl 18 resides in either i) the first-driving-position 18*a*, ii) the first-neutral-position 18*b*, or iii) the middle-neutral-position 18*e*, and wherein the inserted blocking device 60 allows normal back and forth operation of the U-pawl 18 in the first-driving-position 18*a* while ratchet turning the tube in the first-rotational-direction 84, and when the blocking device 60 is inserted and the U-pawl 18 is positioned against the blocking device 60, it creates:

i. a second-neutral-position 18*d* (see FIG. 10) of the U-pawl 18, the second-neutral-position 18*d* allowing freewheeling of the tube 38 in either direction, the U-pawl 18 will remain securely in the second-neutral-position 18*d*, the first spring 10 and the inserted blocking device 60 maintaining the U-pawl 18 position in the second-neutral-position 18*d* unless the U-pawl 18 is manually moved from the second-neutral-position 18*d*.

Figure 21:
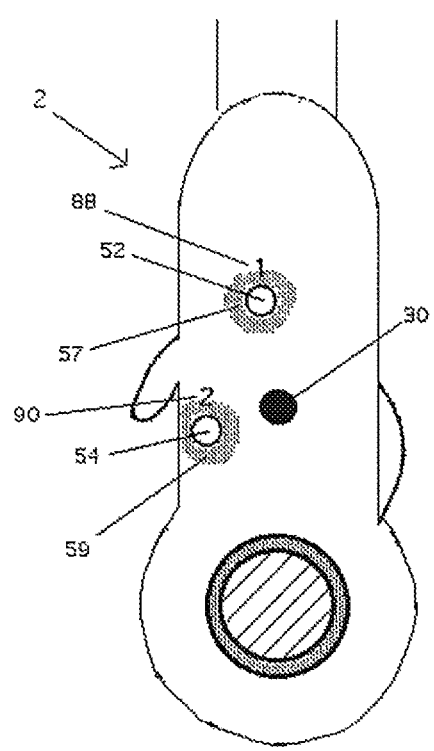
FIG. 21 is a side elevation view of the disclosed invention showing the color-coding of the first-set of holes and the second-set of holes.

FIG. 21 shows the disclosed invention with first hole color-coding 57 around the first-set of holes 52 and the second holes color-coding 59 around the second-set of holes 54, and also shows a first hole numeral 88 designation and a second hole numeral 90 designation. The color-coding 57+59 placed on the handle assembly U-pawl housing 5 around each corresponding hole with different colors to visually distinguish the first-set of holes 52 from the second set of holes 54, and the numerals 88+90 placed on the handle assembly U-pawl housing 5 around each corresponding hole with different numerals to visually distinguish the first-set of holes 52 from the second set of holes 54. Either or both the color-coding and the numeral designations can be used.

Functionality of the Related Parts of the Disclosed Invention:

The first set of holes 52 and the second set of holes 54 can have multiple alternative positions to achieve the same results of the inserted blocking device 60. The equivalent alternate positions of the first set of holes 52 can also be applied to alternative positions for the second set of holes 54.

Figure 22:
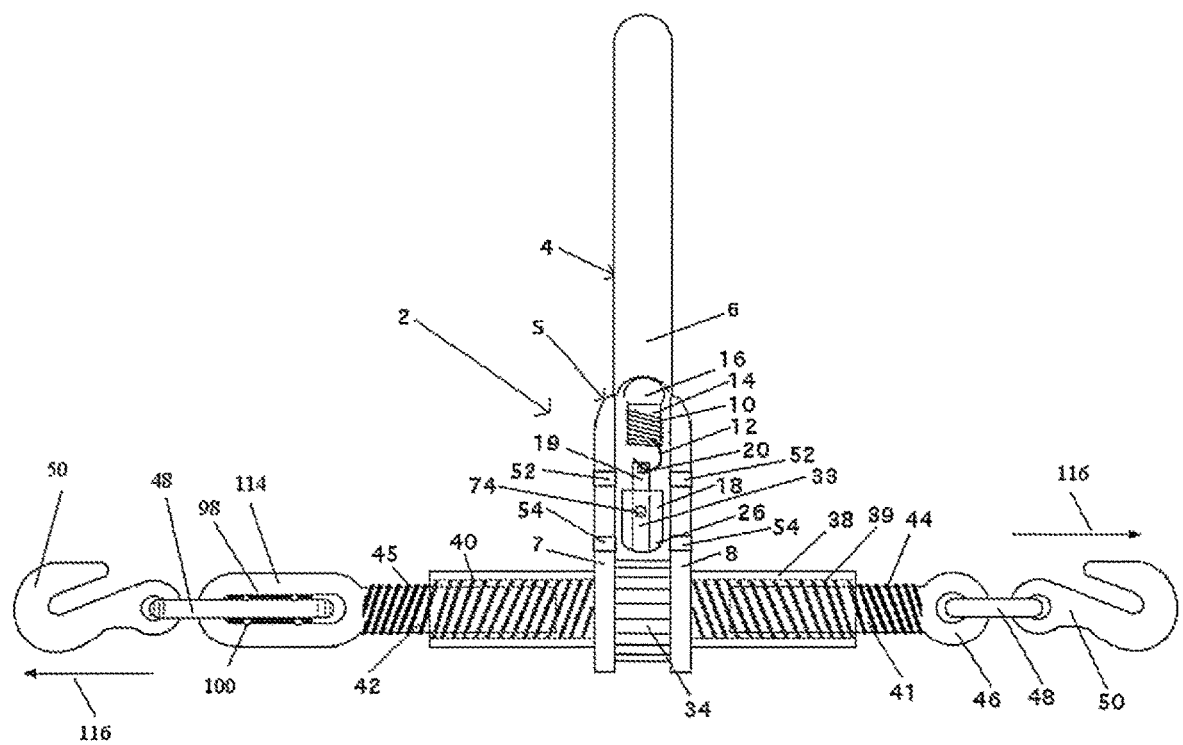
FIG. 22 is a front elevation view showing the extended rod eyelet face side view with a rod flexible connector and hook connector.

FIG. 22 is a front elevation view of the ratchet load binder 2 showing the rod with extended eyelet 114 face side view with a rod flexible connector 48 and hook connector 50. For the purpose of detecting or measuring the tension on the ratchet load binder rods 42, 44, there is only one tension-detecting-device 98 required and only one rod with extended eyelet 114 required. Pulling force applied to the second rod 42 will transfer the same pulling force to the first rod 41. The rod flexible connector 48 is showing the edge of the rod flexible connector 48 and not the face. Positioned between the second rod 42 with extended eyelet 114 eyelet opening and the rod flexible connector 48 opening is the tension-detecting-device 98, in addition the first-operator-communication-device 100 is shown with light emitting diodes (LED) lights for viewing by the operator of the ratchet load binder 2. The tension-detecting-device 98 being connected directly or indirectly to at least one of the rods 42, 44, the tension-detecting-device 98 being a means to detect or measure tension on the ratchet load binder when pulling tension 116 is applied to the rod connection devices such as a hook 50. The second rod 42 connected to the tension-detecting-device 98 can comprise an extended eyelet 114 to make sufficient room for the tension-detecting-device 98 to be positioned and secured in the extended rod eyelet 114. The first-operator-communication-device can be located on or near the tension-detecting-device 98.

The first-operator-communication-device 100 combined with the tension-detecting-device 98 being positioned and secured in place inside the eyelet of the second rod 42 with extended eyelet 114 and is additionally positioned inside the rod flexible connector 48. Securing the first-operator-communication-device 100 inside the rod with extended eyelet 114 will allow the rod flexible connector 48 to flexibly move to attach the rod hook 50 to the chain 112 with ease. When the second rod 42 extended eyelet 114 is installed in the tube 38 and another rod such as the first rod 41 is also installed in the tube 38 and the rods 41, 42 are connected to a load securing device such as a chain 112 and then pulling tension force is applied to one of the rod connection devices such as a hook 50, the combination of the rod flexible connector 48 and the second rod 42 extended eyelet 114 applies force to the tension-detecting-device 98 therefore compressing the tension-detecting-device 98. When the tension-detecting-device 98 is compressed to a particular shortened length, a signal will be transmitted to the first-operator-communication-device 100 allowing the operator be assured sufficient tension is applied to the load securing chain 112 to keep the load 94 secure during transportation of the load 94.

The ratchet load binder 2 utilizes a means to detect or measure tension with the tension-detecting-device 98, the tension-detecting-device 98 communicates with a first-means-of-communication 106 that communicates to a first-operator-communication-device 100 that is viewable by the operator when the operator is operating the ratchet load binder 2. The first-operator-communication-device 100 can comprise a viewable dial, a digital readout, an illumination device such as a single LED light bulb or an array of LED light bulbs. The first-means-of-communication 106 can be a wireless method of communication, a wired method of communication, or both a wireless and a wired means for communication. The tension-detecting-device 98 or the first-operator-communication-device 100 can also comprise a second-means-of-communication 108 for communicating the tension detection or measurement to a second-operator-communication-device 102. The second-operator-communication-device 102 can comprise a viewable dial or multiple viewable dials, a viewable illumination device or multiple viewable illumination devices, the illumination device or devices can be a LED light bulb or a LED light array, or the second-operator-communication-device 102 can comprise a digital readout or multiple digital readouts. The second-means-of-communication 108 can be a wireless method of communication, a wired method of communication, or both a wireless and a wired means for communication.

The second-operator-communication-device 102 can comprises a memory and a third-means-of-communication 110 that is suitable to communicate the tension detection or measurement to a third-operator-communication-device 104. The third-means-of-communication 110 can be a GPS communication method or a cellular communication method.

the tension-detecting-device 98 or the first-operator-communication-device 100 can be powered by i) a battery, or ii) a direct current (DC) wired connection, or iii) a battery and a direct current (DC) wired connection. The second-operator-communication-device 102 can be powered by i) a battery, or ii) a direct current (DC) wired connection, or iii) a battery and a direct current (DC) wired connection. The third-operator-communication-device 104 can be powered by, i) a battery, or ii) a direct current (DC) wired connection, or iii) an alternating current (AC) wired connection, or iv) a battery, a direct current (DC) wired connection, and an alternating current (AC) wired connection. In addition, the first-operator-communication-device 100, the second-operator-communication-device 102, and the third-operator-communication-device 104 can be provided with i) a visual alert, or ii) an audio alert, or iii) a visual and audio alert when the tension detection or measurement drops below a certain detection or measurement point. The third-operator-communication-device 104 can comprise a viewable monitor.

The means to detect or measure tension with the tension-detecting-device 98 can be the pressing together of two contacts 118 (see FIG. 23*b*) during compression of the tension-detecting-device 98, therefore, completing an electrical circuit to i) the first-operator-communication-device 100, or ii) the second-operator-communication-device 102, or iii) the first-operator-communication-device 100 and the second-operator-communication-device 102. The second-operator-communication-device 102 can be located in the cab of a transportation vehicle 92 such as a truck. The third-operator-communication-device 104 can be located in a vehicle monitoring station 96. The first-means-of-communication 106, the second-means-of-communication 108, and the third-means-of-communication 110 can be a pulsed communication or a maintained communication.

The ratchet load binder 2 tension-detecting-device 98 can also be positioned between the tube and farthest end of the connection device 50 on the second end of at least one of the rods 41, 42, the tension-detecting-device 98 being a means to detect or measure tension on the ratchet load binder 2 when pulling tension is applied to the rod connection devices 50. The tension-detecting-device 98 can be positioned and secured in the extended rod eyelet 114, the rod eyelet being elongated to accommodate the tension-detecting-device 98. The tension pull direction 116 is shown in FIG. 22.

One method for achieving the means to detect or measure the tension on the ratchet load binder 2 is using contact points that connect to each other when the tension-detecting-device 98 is compressed. When the contact points connect, an electrical voltage signal can be transferred and maintained or pulsed from a battery to an LED light bulb enclosed in the first-operator-communication-device 100 that is connected to or located close to the tension-detecting-device 98. In addition, when the contact points connect, another wireless or wired signal can be sent and maintained or pulsed from the first-operator-communication-device 100 to the second-operator-communication-device 102 in another location such as inside the cab of the transport vehicle 92 where the operator can view the second-operator-communication-device 102 to make sure the each load securing chain 112 is properly tensioned with sufficient tension force. Further in addition, when the contact points connect, another wireless or wired signal can be sent and maintained or pulsed from the second-operator-communication-device 102 to the third-operator-communication-device 104 in another location such as inside vehicle monitoring station where the monitoring person can view the third-operator-communication-device 104 to notify the operator of the transport vehicle that the load securing chains 112 are or are not properly tensioned with sufficient tension force.

Figure 23A:
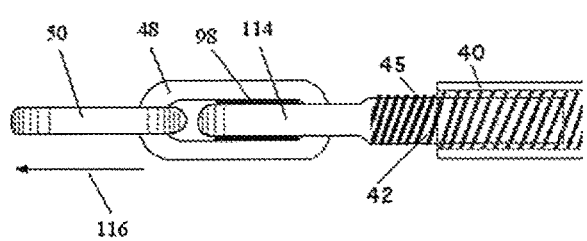
FIG. 23 is a front elevation view showing the extended rod eyelet edge side view with a rod flexible connector and hook connector.

FIG. 23*a* is a front elevation view showing the extended rod eyelet 114 edge side view with a rod flexible connector 48 and hook connector 50. The tension pull direction 116 is shown along with the tension-detecting-device 98.

Figure 23B:
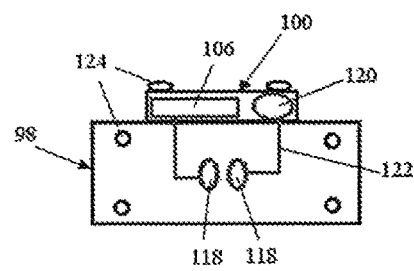

FIG. 23*b* is a side elevation of the tension-detecting-device 98 and the first-operator-communication-device 100 showing the contacts 118, electrical wires 122, battery 120, LED light bulbs 124, and the first mean of communication 106. The first-operator-communication-device 100 is designed to compress under great pressure force, therefore, pressing the contacts 118 together to complete an electrical circuit. Variations of the pressure force resistance of the tension-detecting-device 98 may be used to vary the indication or measurement of the tension force on the ratchet load binder 2, or different variations of spacing the contacts apart may also be used to vary the indication or measurement of the tension force on the ratchet load binder 2.

Figure 24:
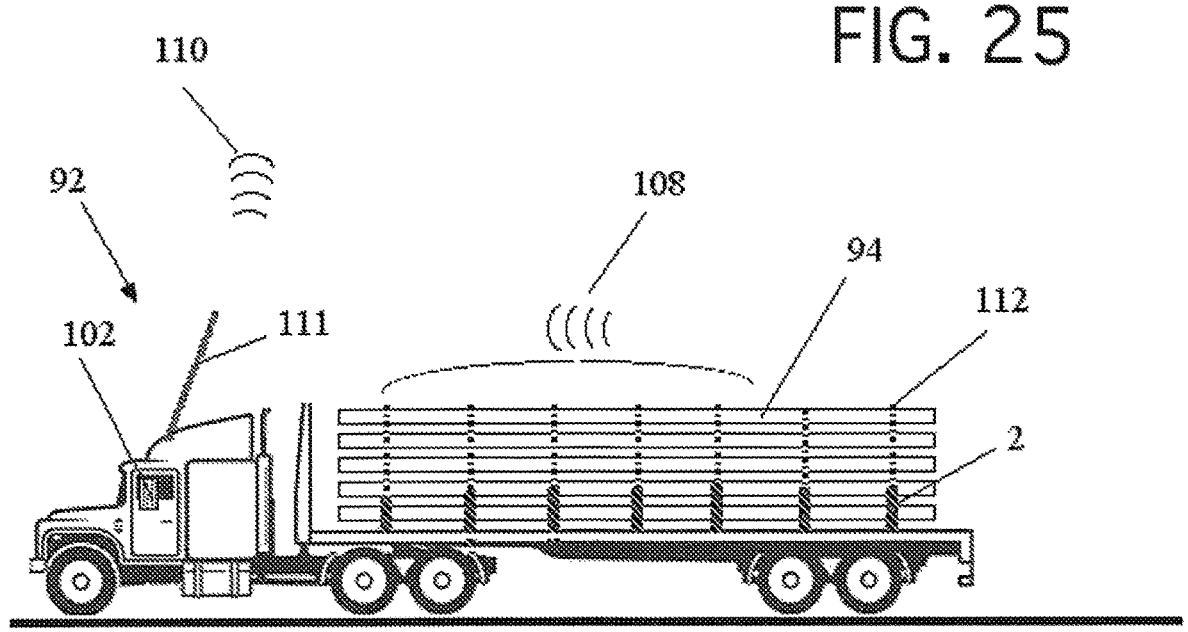
FIG. 24 is a side elevation view of a transportation truck, transported load and ratchet binders and chain securing the load.

FIG. 24 is a side elevation view of a transportation vehicle 92, transported load 94, ratchet binders 2 and chain 112 securing the load 94. The truck employs an antenna 111 for receiving the second-means-of-communication 108 to transfer to the second-operator-communication-device 102. Also shown is the third-means-of-communication 110 sent to the vehicle monitoring station 96 (see FIG. 25).

In addition, FIG. 24 exhibits a system comprising:
a) the ratchet binder 2 comprising a tension-detecting-device 98;
b) a transportation vehicle 92 with a rear flat deck;
c) a load 94 destined for transportation positioned on the deck of the transportation vehicle 92 deck;
d) a load securing chain 112.
one end of the load securing chain 112 attached to the rear flat deck, a length of the chain 112 secured on the load 94, one end of the ratchet binder 2 attached to the chain 112, and the other end of the ratchet binder 2 attached to the rear flat deck opposing the rear flat deck side the chain 112 is attached to.

Figure 25:
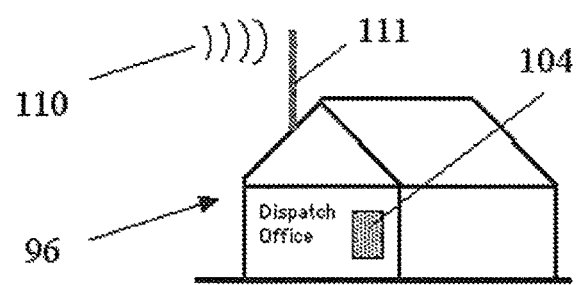
FIG. 25 is a front elevation of a vehicle monitoring station with a third-operator-communication-device.

FIG. 25 is a front elevation of a vehicle monitoring station 96 with a third-operator-communication-device 104. An antenna 111 for receiving the third-means-of-communication 110 is also shown.

Figure 26:
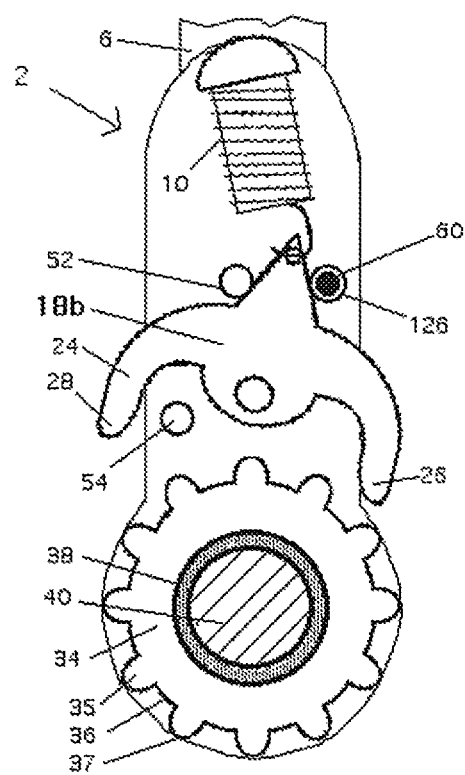
FIG. 26 shows a side elevation of the ratchet load binder with a third set of holes 126.

FIG. 26 Shows the ratchet load binder with a third set of holes 126. The third hole 128 can serve the purpose of the operator of the ratchet load binder 2 having the U-Pawl 18 blocked from moving into the first driving position when the U-Pawl 18 is in either i) the first neutral position, or ii) the neutral position, or iii) the second neutral position, or iv) the second driving position. This situation may arise if the load 94 on the truck 92 is somewhat fragile and the chains 112 securing load should not exceed a certain tension for fear of damaging the load 94. The operator may block the U-Pawl 18 to prevent vandalism, tampering, or a mistaken tightening of the load beyond a particular tension on the chain 112 securing the load. After the operator of the ratchet load binder 2 tightens the load securing chains to the proper tension and the tension-detecting-device 98 and the first-operator-communication-device 100 signals that the load 94 is sufficiently tensioned, the operator can then move the U-Pawl 18 into the neutral position and then insert the blocking device 60 into the hole 128 to prevent further tightening of the tension on the load. The blocking device 60 is shown inserted in the third hole 128.

The foregoing detailed description is given primarily for clearness of understanding and no unnecessary limitations are to be understood there from, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

I claim:

1. A ratchet load binder comprising:
a) an elongated tube having opposing open ends and internal threads, a first end having right-hand internal threads and a second end having left-hand internal threads, a gear encircling the tube, the gear rigidly attached to the tube, the gear having externally facing gear teeth;
b) a first rod comprising right hand external threads mating to the threads in the first end of the tube, the threads starting at a first end of the first rod and extending along the first rod, a second rod comprising left hand external threads mating to the threads in the second end of the tube, the threads starting at a first end of the second rod and extending along the second rod, the first rod threading into the first end of the tube, the second rod threading into the second end of the tube, the tube movable in a first-rotational-direction and the tube movable in a second-rotational-direction, the first-rotational-direction of the tube moves the rods closer to each other while the rods are stationary in rotation, the second-rotational-direction of the tube moves the rods farther away from each other while the rods are stationary in rotation, each second end of each of the rod having a connection device;
c) a handle assembly comprising a shaft and two separated sides, the sides rotatably mounted around the tube to rotate completely around the tube while straddling the gear, the handle assembly generally perpendicular to the tube, the handle assembly having a first side positioned on one side of the gear and a second side positioned on the opposing side of the gear, the handle assembly the first and second sides encircling the tube;
d) a pivotal attached U-shaped-pawl referred herein as the U-pawl with a first tooth on one end of the U-pawl and a second tooth on the opposing end of the U-pawl, the first tooth for driving rotation of the tube in the first-rotational-direction and the second tooth for driving rotation of the tube in the second-rotational-direction, the U-pawl teeth for engaging the gear teeth, the U-pawl attached to the handle assembly between the first side and the second side, the U-pawl pivoting on a pivot axle inserted at a pivot hole on the U-pawl, the axle being attached to the handle assembly the first side and the second side that straddles the gear, the pivot axle on the U-pawl being generally centered between the first tooth and the second tooth of the U-pawl, the U-pawl comprising;
  i) a first-driving-position;
  ii) a second-driving-position;
  iii) a middle-neutral-position, and wherein either i) the middle-neutral-position is not securely held in position, or ii) the middle-neutral-position is securely held in position;
e) a means for applying flexible pressure on the U-pawl causing the U-pawl to be held securely in either the first-driving-position or the second-driving-position, the means for applying flexible pressure on the U-pawl keeping the first tooth of the U-pawl or the second tooth of the U-pawl engaged with the gear teeth during ratcheting rotation of the tube, the means for applying flexible pressure on the U-pawl allowing flexible pivotal movement of the first tooth of the U-pawl or the second tooth of the U-pawl around gear teeth roots and gear teeth tips for incremental back and forth movement of the handle assembly and the U-pawl during a ratcheting rotational movement of the tube, wherein moving the U-pawl from the first-driving-position to the second-driving-position or vice versa requires the U-pawl to be manually and forcefully pivoted;
f) means for insertion of a blocking device in the handle assembly wherein the insertion of the blocking device in the handle assembly prevents the U-pawl from pivoting from the first-driving-position into the second-driving-position while allowing the U-pawl movement in the first-driving-position, and wherein the insertion of the blocking device allows normal back and forth operation of the U-pawl in the first-driving-position while ratchet turning the tube in the first-rotational-direction; and
g) a tension-detecting-device connected directly or indirectly to at least one of the rods, the tension-detectingdevice being a means to detect or measure tension on the ratchet load binder when pulling tension is applied to the connection devices.

2. The ratchet load binder of claim 1 wherein the means to detect or measure tension with the tension-detecting-device is communicated with a first-means-of-communication that communicates to a first-operator-communication-device.

3. The ratchet load binder of claim 2 wherein the first-operator-communication-device comprises a viewable dial.

4. The ratchet load binder of claim 2 wherein the first-operator-communication-device comprises an illumination device.

5. The ratchet load binder of claim 4 wherein the illumination device is a single LED light bulb or a LED light array.

6. The ratchet load binder of claim 2 wherein the first-operator-communication-device comprises a digital readout.

7. The ratchet load binder of claim 2 wherein the first-means-of-communication is either i) a wireless communication method, or ii) a wired communication method, or iii) both a wireless communication method and a wired communication method.

8. The ratchet load binder of claim 2 wherein the tension-detecting-device or the first-operator-communication-device comprises a second-means-of-communication for communicating tension detection or measurement to a second-operator-communication-device.

9. The ratchet load binder of claim 8 wherein the second-operator-communication-device comprises a viewable dial or multiple viewable dials.

10. The ratchet load binder of claim 8 wherein the second-operator-communication-device comprises a viewable illumination device or multiple viewable illumination devices.

11. The ratchet load binder of claim 10 wherein the illumination device or devices are a LED light bulb or a LED light array.

12. The ratchet load binder of claim 8 wherein the second-operator-communication-device comprises a digital readout or multiple digital readouts.

13. The ratchet load binder of claim 8 wherein the second-means-of-communication is either i) a wireless communication method, or ii) a wired communication method, or iii) both a wireless communication method and a wired communication method.

14. The ratchet load binder of claim 8 wherein the second-operator-communication-device comprises a memory and a third-means-of-communication that is suitable to communicate the tension detection or measurement to a third-operator-communication-device.

15. The ratchet load binder of claim 14 wherein the third-means-of-communication is a wireless communication method.

16. The ratchet load binder of claim 15 wherein the third-means-of-communication is a GPS communication method.

17. The ratchet load binder of claim 15 wherein the third-means-of-communication is a cellular communication method.

18. The ratchet load binder of claim 14 wherein the third-operator-communication-device is powered by i) a battery, or ii) a direct current (DC) wired connection, or iii) an alternating current (AC) wired connection, or iv) a battery, a direct current (DC) wired connection, and an alternating current (AC) wired connection.

19. The ratchet load binder of claim 14 wherein the third-operator-communication-device provides i) a visual alert, or ii) an audio alert, or iii) a visual and audio alert when the tension detection or measurement drops below a certain detection or measurement point.

20. The ratchet load binder of claim 14 wherein the third-operator-communication-device comprises a viewable monitor.

21. The ratchet load binder of claim 14 wherein the third-operator-communication-device is located in a vehicle monitoring station.

22. The ratchet load binder of claim 14 wherein the third-means-of-communication is a pulsed communication or a maintained communication.

23. The ratchet load binder of claim 8 wherein the second-operator-communication-device is powered by i) a battery, or ii) a direct current (DC) wired connection, or iii) a battery and a direct current (DC) wired connection.

24. The ratchet load binder of claim 8 wherein the second-operator-communication-device provides i) a visual alert, or ii) an audio alert, or iii) a visual and audio alert when the tension detection or measurement drops below a certain detection or measurement point.

25. The ratchet load binder of claim 8 wherein the second-operator-communication-device is located in a cab of a transportation vehicle such as a truck.

26. The ratchet load binder of claim 8 wherein the second-means-of-communication can is a pulsed communication or a maintained communication.

27. The ratchet load binder of claim 2 wherein the tension-detecting-device or the first-operator-communication-device is powered by i) a battery, or ii) a direct current (DC) wired connection, or iii) a battery and a direct current (DC) wired connection.

28. The ratchet load binder of claim 2 wherein the first-operator-communication-device provides i) a visual alert, or ii) an audio alert, or iii) a visual and audio alert when tension detection or measurement drops below a certain detection or measurement point.

29. The ratchet load binder of claim 2 wherein the first-operator-communication-device is located on or near the tension-detecting-device.

30. The ratchet load binder of claim 2 wherein the first-means-of-communication is a pulsed communication or a maintained communication.

31. The ratchet load binder of claim 1 wherein the means to detect or measure tension with the tension-detecting-device is pressing together of two contacts during compression of the tension-detecting-device, therefore, completing an electrical circuit to i) a first-operator-communication-device, or ii) a second-operator-communication-device, or iii) a first-operator-communication-device and a second-operator-communication-device.

32. The ratchet load binder of claim 1 wherein at least one of the rods comprises an elongated eyelet and the tension-detecting-device is positioned and secured inside the elongated eyelet.

33. A system comprising:
a) the ratchet binder of claim 1;
b) a transportation vehicle with a rear flat deck;
c) a load destined for transportation positioned on a deck of the transportation vehicle deck;
d) a load securing chain;
one end of the load securing chain attached to the rear flat deck, a length of the chain secured on the load, one end of the ratchet binder attached to the chain, and the other end of the ratchet binder attached to the rear flat deck opposing the rear flat deck side the chain is attached to.

34. A ratchet load binder comprising:
a) an elongated tube having opposing open ends and internal threads, a first end having right-hand internal threads and a second end having left-hand internal threads, a gear encircling the tube, the gear rigidly attached to the tube, the gear having externally facing gear teeth;
b) a first rod comprising right hand external threads mating to the threads in the first end of the tube, the threads starting at a first end of the rod and extending along the rod, a second rod comprising left hand external threads mating to the threads in the second end of the tube, the threads starting at a first end of the rod and extending along the rod, the first rod threading into the first end of the tube, the second rod threading into the second end of the tube, the tube movable in a first-rotational-direction and the tube movable in a second-rotational-direction, the first-rotational-direction of the tube moves the rods closer to each other while the rods are stationary in rotation, the second-rotational-direction of the tube moves the rods farther away from each other while the rods are stationary in rotation, each second end of each rod having a connection device;
c) a handle assembly comprising a shaft and two separated sides, the sides rotatably mounted around the tube to rotate completely around the tube while straddling the gear, the handle assembly generally perpendicular to the tube, the handle assembly having a first side positioned on one side of the gear and a second side positioned on the opposing side of the gear, the handle assembly first and second sides encircling the tube;
d) a pivotal attached U-shaped-pawl referred herein as a U-pawl with a first tooth on one end of the U-pawl and a second tooth on opposing end of the U-pawl, the first tooth for driving rotation of the tube in the first-rotational-direction and the second tooth for driving a rotation of the tube in the second-rotational-direction, the U-pawl teeth for engaging the gear teeth, the U-pawl attached to the handle assembly between the first side and the second side, the U-pawl pivoting on an axle inserted at a pivot hole on the U-pawl, the axle being attached to the handle assembly first side and the second side that straddles the gear, a pivot axle on the U-pawl being generally centered between the first tooth and the second tooth of the U-pawl, the U-pawl comprising;
 i) a first-driving-position;
 ii) a second-driving-position;
 iii) a middle-neutral-position, and wherein either i) the middle-neutral-position is not securely held in position, or ii) the middle-neutral-position is securely held in position;
e) a means for applying flexible pressure on the U-pawl causing the U-pawl to be held securely in either the first-driving-position or the second-driving-position, the means for applying flexible pressure on the U-pawl keeping the first tooth of the U-pawl or the second tooth of the U-pawl engaged with the gear teeth during ratcheting rotation of the tube, the means for applying flexible pressure on the U-pawl allowing flexible pivotal movement of the first tooth of the U-pawl or the second tooth of the U-pawl around gear teeth roots and gear teeth tips for incremental back and forth movement of the handle assembly and the U-pawl during a ratcheting rotational movement of the tube, wherein moving the U-pawl from the first-driving-position to the second-driving-position or vice versa requires the U-pawl to be manually and forcefully pivoted; and
f) a tension-detecting-device positioned between the tube and farthest end of the connection device on the second end of at least one of the rods, the tension-detecting-device being a means to detect or measure tension on the ratchet load binder when pulling tension is applied to the connection devices.

35. The ratchet load binder of claim 34 wherein the tension-detecting-device is positioned and secured in a rod eyelet.

\* \* \* \* \*